March 1, 1960

E. O. BLODGETT 2,927,158

CODE-FORM CONVERTER

Filed Nov. 15, 1955

*INVENTOR.*
EDWIN O. BLODGETT

BY

ATTORNEY

INVENTOR
EDWIN O. BLODGETT
ATTORNEY

March 1, 1960

E. O. BLODGETT 2,927,158

CODE-FORM CONVERTER

Filed Nov. 15, 1955

INVENTOR.
EDWIN O. BLODGETT
BY
ATTORNEY

INVENTOR.
EDWIN O. BLODGETT
BY
ATTORNEY

March 1, 1960  E. O. BLODGETT  2,927,158
CODE-FORM CONVERTER
Filed Nov. 15, 1955  15 Sheets-Sheet 6
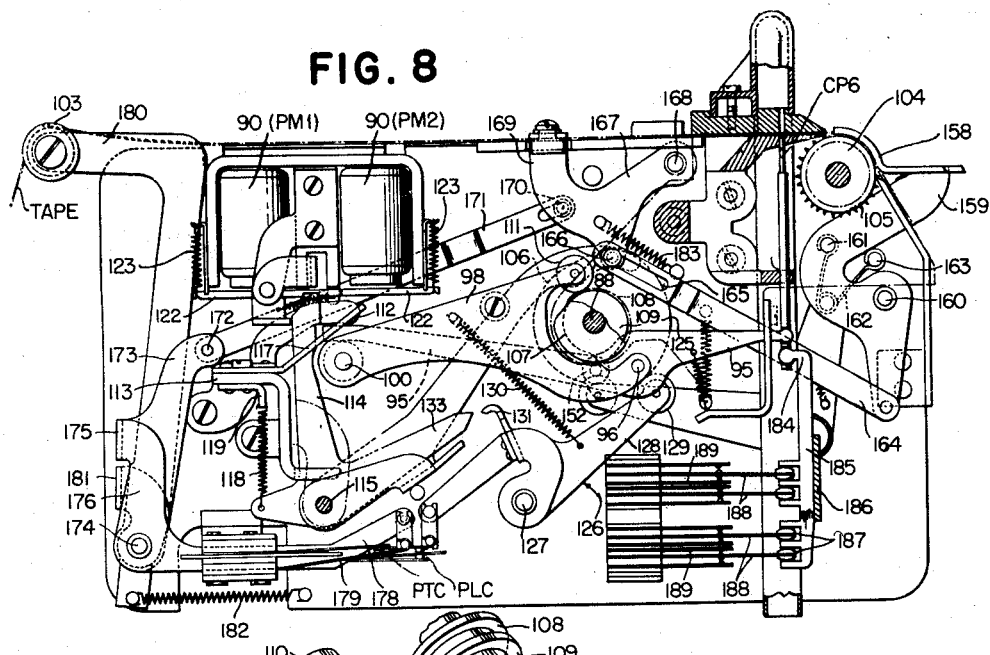
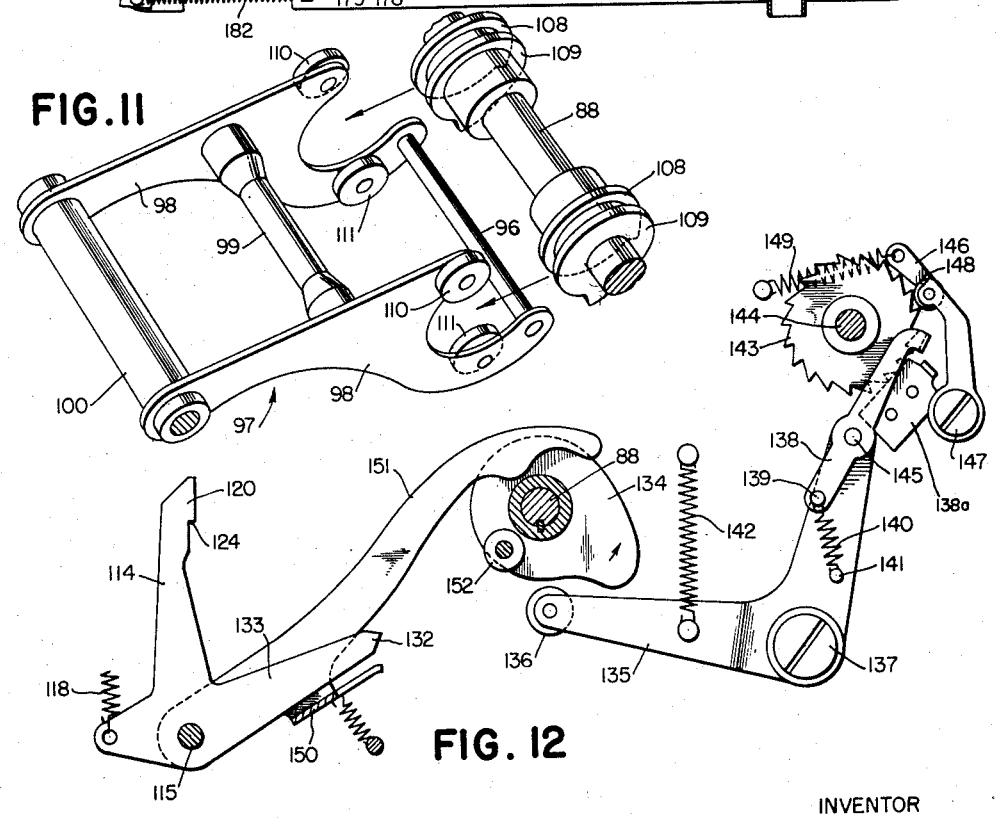
INVENTOR
EDWIN O. BLODGETT
BY
ATTORNEY March 1, 1960  E. O. BLODGETT  2,927,158
CODE-FORM CONVERTER
Filed Nov. 15, 1955  15 Sheets-Sheet 7

INVENTOR.
EDWIN O. BLODGETT
BY
ATTORNEY

March 1, 1960 — E. O. BLODGETT — 2,927,158
CODE-FORM CONVERTER
Filed Nov. 15, 1955 — 15 Sheets-Sheet 8

INVENTOR.
EDWIN O. BLODGETT
BY
ATTORNEY

March 1, 1960 — E. O. BLODGETT — 2,927,158
CODE-FORM CONVERTER
Filed Nov. 15, 1955 — 15 Sheets-Sheet 10

INVENTOR.
EDWIN O. BLODGETT
BY
ATTORNEY

INVENTOR.
EDWIN O. BLODGETT
BY
ATTORNEY

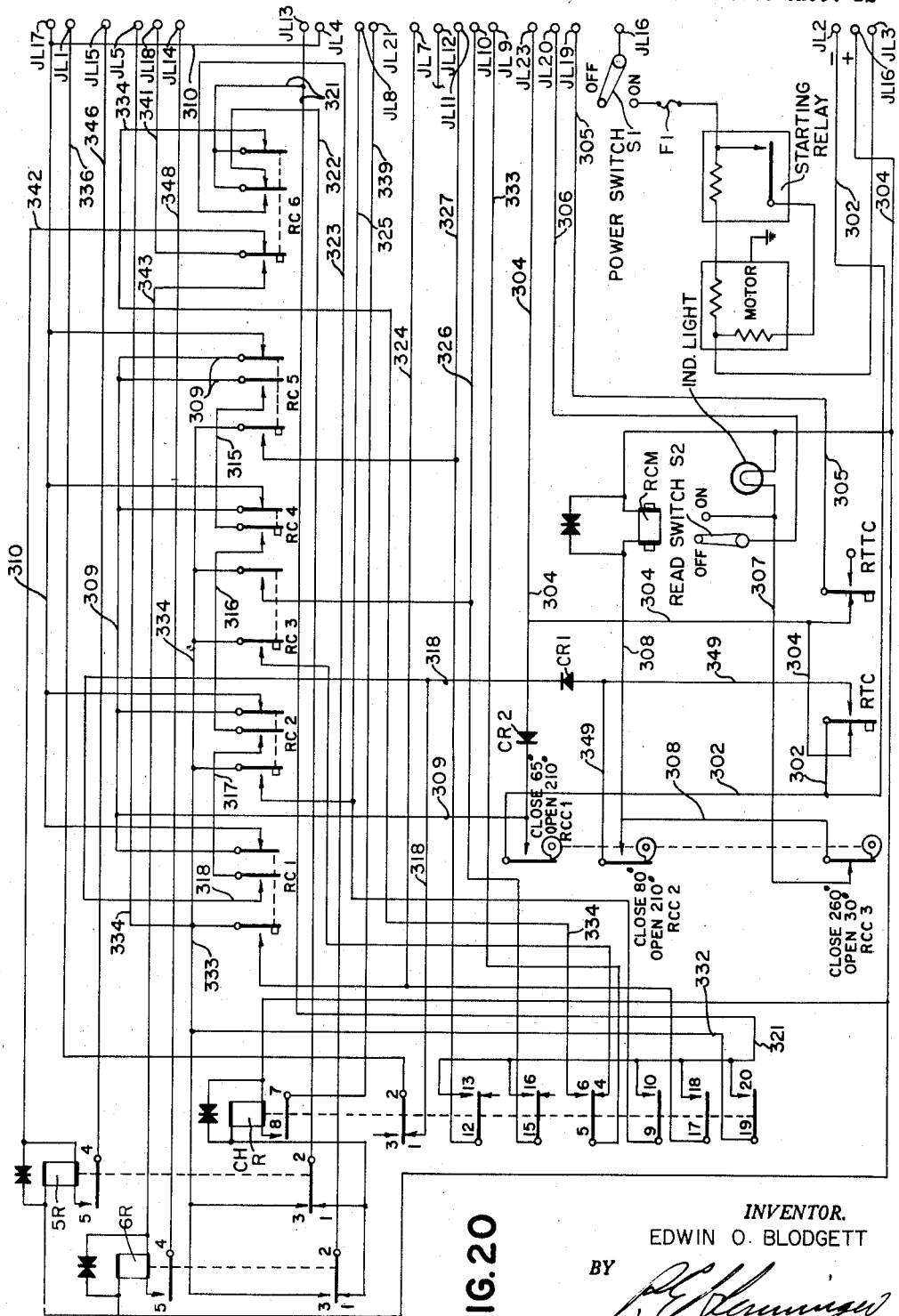

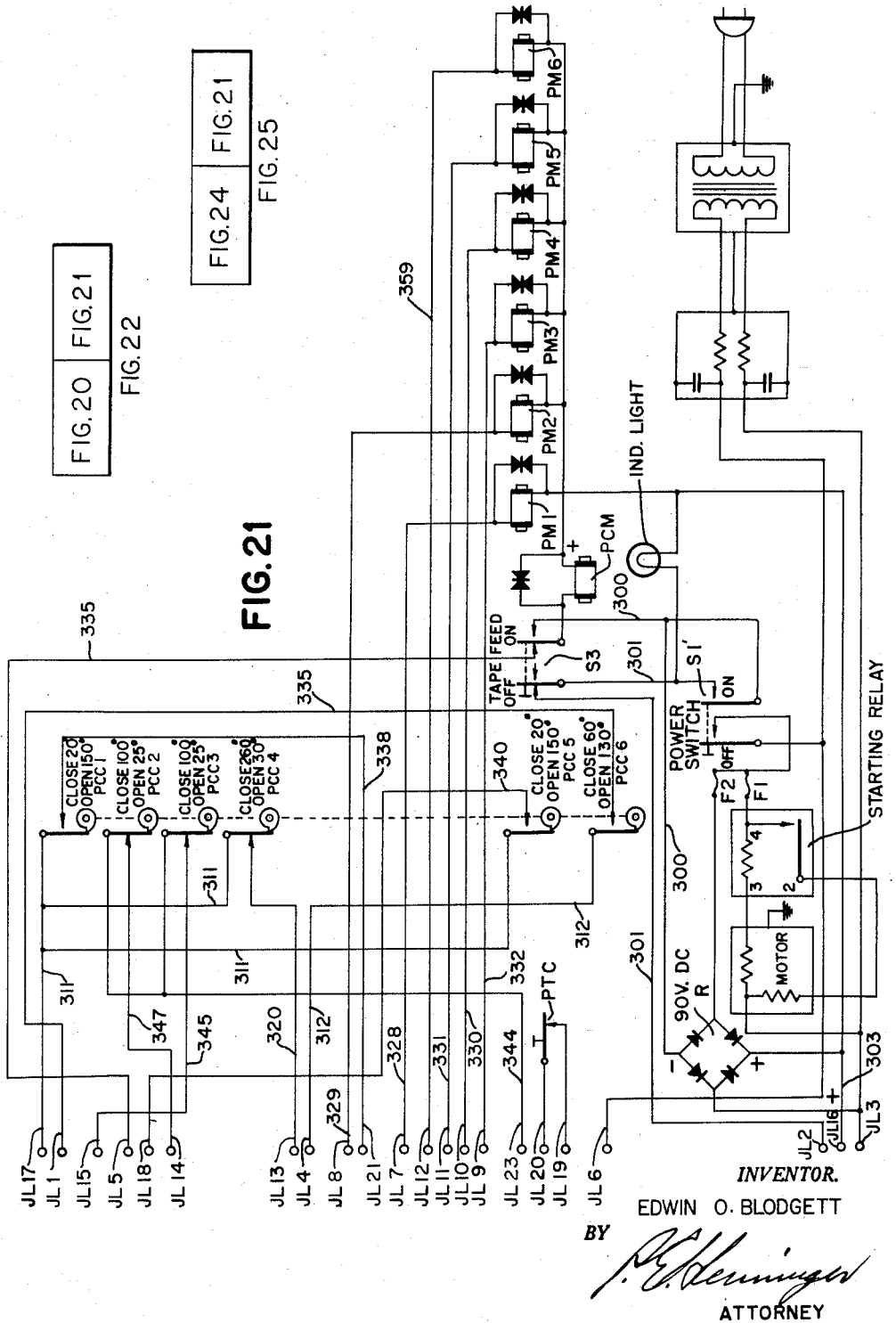

March 1, 1960    E. O. BLODGETT    2,927,158
CODE-FORM CONVERTER
Filed Nov. 15, 1955    15 Sheets-Sheet 14

| Character | | Code | Character | | Code |
|---|---|---|---|---|---|
| a | A | 1-2 | 3 | # | 6-1 |
| b | B | 1-4-5 | 4 | $ | 6-2-4 |
| c | C | 2-3-4 | 5 | % | 6-5 |
| d | D | 1-4 | 6 | ¢ | 6-1-3-5 |
| e | E | 1 | 7 | & | 6-1-2-3 |
| f | F | 1-3-4 | 8 | * | 6-2-3 |
| g | G | 2-4-5 | 9 | ( | 6-4-5 |
| h | H | 3-5 | 0 | ) | 6-2-3-5 |
| i | I | 2-3 | . | . | 6-3-4-5 |
| j | J | 1-2-4 | , | , | 6-2-4-5 |
| k | K | 1-2-3-4 | ; | : | 6-2-3-4 |
| l | L | 2-5 | ' | " | 6-1-2-4 |
| m | M | 3-4-5 | 1 | ! | 6-1-2-3-5 |
| n | N | 3-4 | / | ? | 6-2-3-4-5 |
| o | O | 4-5 | FUNCTION CODES | | |
| p | P | 2-3-5 | Lower Case | | 6-3-5 |
| q | Q | 1-2-3-5 | Upper Case | | 6-2-5 |
| r | R | 2-4 | Back Space | | 6-2 |
| s | S | 1-3 | One Unit Space | | 6-1-5 |
| t | T | 5 | Space Bar (2 unit) | | 6-3 |
| u | U | 1-2-3 | Three Units | | 6-1-4 |
| v | V | 2-3-4-5 | Four Units Space | | 6-1-4-5 |
| w | W | 1-2-5 | Five Units Space | | 6-1-3-4 |
| x | X | 1-3-4-5 | Tab | | 6-4 |
| y | Y | 1-3-5 | Carriage Return | | 4 |
| z | Z | 1-5 | Code Delete | | 6-1-2-3-4-5 |
| - | - | 6-1-2 | Stop Code | | 6 |
| 2 | @ | 6-1-2-5 | Shift to 5 Level | | 1-2-3-4-5 |
| Codes 6-1-3-4-5 and | | | Shift to 6 Level | | 1-2-4-5 |
| 6-1-2-4-5 cannot be used | | | | | |

FIG. 23

INVENTOR.
EDWIN O. BLODGETT
BY
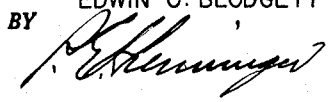
ATTORNEY

United States Patent Office

2,927,158
Patented Mar. 1, 1960

2,927,158

CODE-FORM CONVERTER

Edwin O. Blodgett, Rochester, N.Y., assignor to Commercial Controls Corporation, Rochester, N.Y., a corporation of Delaware Application November 15, 1955, Serial No. 546,902

7 Claims. (Cl. 178—26)

The present invention relates to information code converters for receiving information recorded by use of a code employing a preselected number of code bits or code channels and automatically re-recording the same information by use of a code having a larger or smaller number of code bits or channels. While the invention is of general application, it is particularly suited for use in systems operating with punched tape and will be described in that connection.

There are many present-day applications where information is recorded in punched tape by use of an appropriate punch code conventionally having as many as eight code bits. Where transmission of the recorded information to a remote point by wire is anticipated, the recording code selected is usually one having the smallest suitable number of code bits. For example, one form of standard telecommunications system employs a five bit code for this purpose. There are certain applications, however, where the information to be recorded is of sufficiently large scope that a six bit or even a seven bit code provides the minimum number of code elements which can be used to record the full extent of information available. Thus, the United States Patents Nos. 2,700,421 and 2,700,447 granted to Edwin O. Blodgett on January 25, 1955, disclose arrangements of justifying typewriters using a seven bit code to record character-print, functional-control, and justification-contral information required to print justified copy. In this, one form of typewriting machine is a so-called trial copy machine and records its information on punched tape which is thereafter read by two readers of the final copy machine and the recorded information used automatically to operate the latter machine in producing justified printed copy. Since the seven bit (or seven chanel) code is not ordinarily suited for wire transmission to a remote point, the co-pending application Serial No. 543,713, entitled Justification Control Information Recorder, filed October 31, 1955, in the name of Edwin O. Blodgett and assigned to the same assignee as the present application, discloses a form of justification arrangement in which the required justification code is rearranged as contrasted with that supplied by the trial copy machine and as so rearranged is suitable for recording by use of a six bit code.

A six bit code as used in the arrangement last described is suitable for wire transmission to a remote point by a small number of present-day telecommunication systems, but the great majority of such systems use a five bit code. Accordingly, it would be desirable in those applications where the information to be recorded is of such scope that the recording code employed must exceed five bits that the information recorded be somewhat rearranged and re-recorded for wire transmission using only a five bit code. After transmission, the coded information again should be reconverted to the form of the initially coded information for utilization in the same general type of equipment which initially recorded the information. In this, it would be further desirable that such conversion and reconversion be accomplished in an entirely automatic manner requiring minimum operating personnel supervision and that it be accomplished by relatively simple and inexpensive apparatus.

In effecting apparatus simplification as last mentioned, it would be desirable to have a relatively compact, rugged and inexpensive motorized unit adaptable with minimum constructional changes to drive either a punched-tape code reader or recorder while housing certain control-system components required for either application. Further, and to enhance the very high rate of information transfer desired during both code conversion and reconversion, it would be desirable that the motorized drive control of both the code reader and punch units be accomplished in an exceptionally rapid and precise manner consistently accurate and reliable over long operating periods without requiring maintenance attention. The several desirable characteristics present rather severe constructional and operational problems especially in regard the relatively sensitive code reader unit, which should have a higher operating rate than the punch unit to permit reading and storing of a read code awaiting its acceptance by the punch unit while yet accomplishing storage in a simple yet reliable manner characterized by high operational precision and at the same time reducing the storage interval to the minimum possible value.

It is an object of the present invention, therefore, to provide a new and improved recorded information code-form converter which automatically receives information recorded by use of a code employing a preselected number of code bits and automatically re-records the same information but by use of a code having a smaller number of code bits.

It is a further object of the invention to provide a recorded information code-form converter which accomplishes entirely automatically code-form conversions from a code form used in recording information to a new code form, and vice versa, yet does so without loss of any information in the conversion process.

It is an additional object of the invention to provide a recorded information code-form converter of relatively simple and inexpensive construction requiring minimized operational supervision and dispensing with the need for skilled operating personnel, and one requiring a minimum of maintenance attention during prolonged periods of operation.

It is yet another object of the invention to provide a novel punched tape code-form converter for receiving and reading punched tape, which records information using either a six bit or five bit punch code, and re-records the information in a new punched tape by use of a punch code having a smaller or larger number of code bits than employed with the read tape.

It is a further object of the invention to provide a recorded information code-form converter which operates to convert a six bit code to a five bit code, or vice versa, without loss of information during conversion or reconversion and one wherein the information recorded in five bit code form employs the standard five bit or five channel telecommunication code assignment.

It is an additional object of the invention to provide a recorded information code-form converter having a high degree of accuracy and reliability in operation and one having high rate of information handling capacity.

It is yet another object of the invention to provide a novel motorized drive unit of relatively inexpensive, rugged and compact construction readily adaptable with a minimum of simple constructional changes to either code reader or code punch application.

It is a further object of the invention to provide a new and improved motorized code reader unit characterized by high information handling capacity and high operational precision while at the same time accomplishing storage of read information for brief intervals in an exceptionally simple yet reliable manner.

Other objects and advantages of the invention will appear as the detailed description proceeds in the light of the drawings forming a part of this application and in which.

Figure 13:
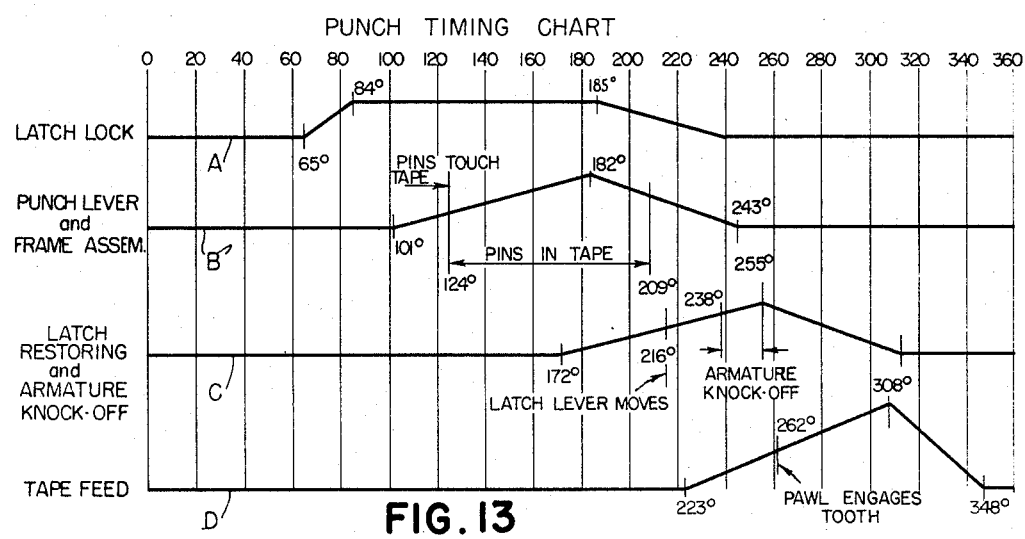
Figure 19:
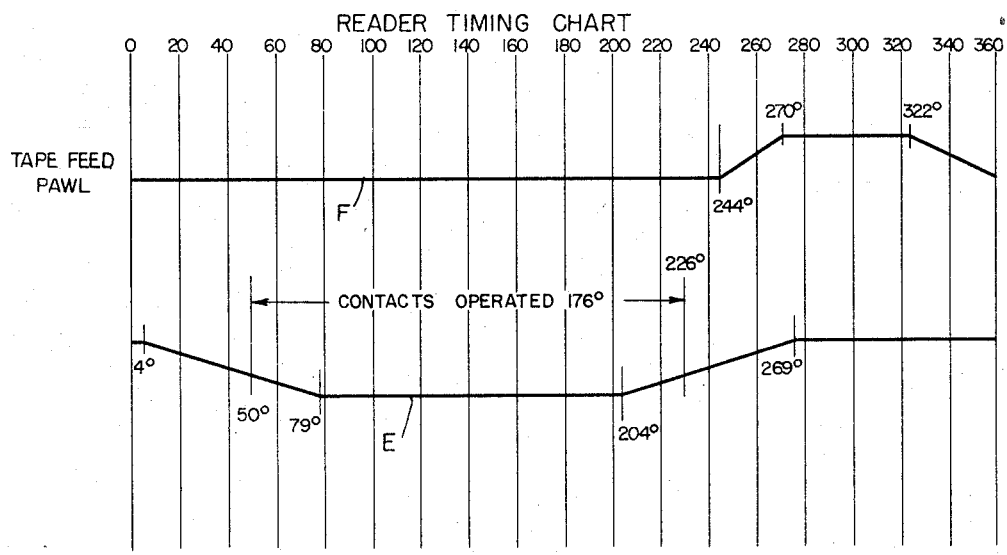
Figure 24:
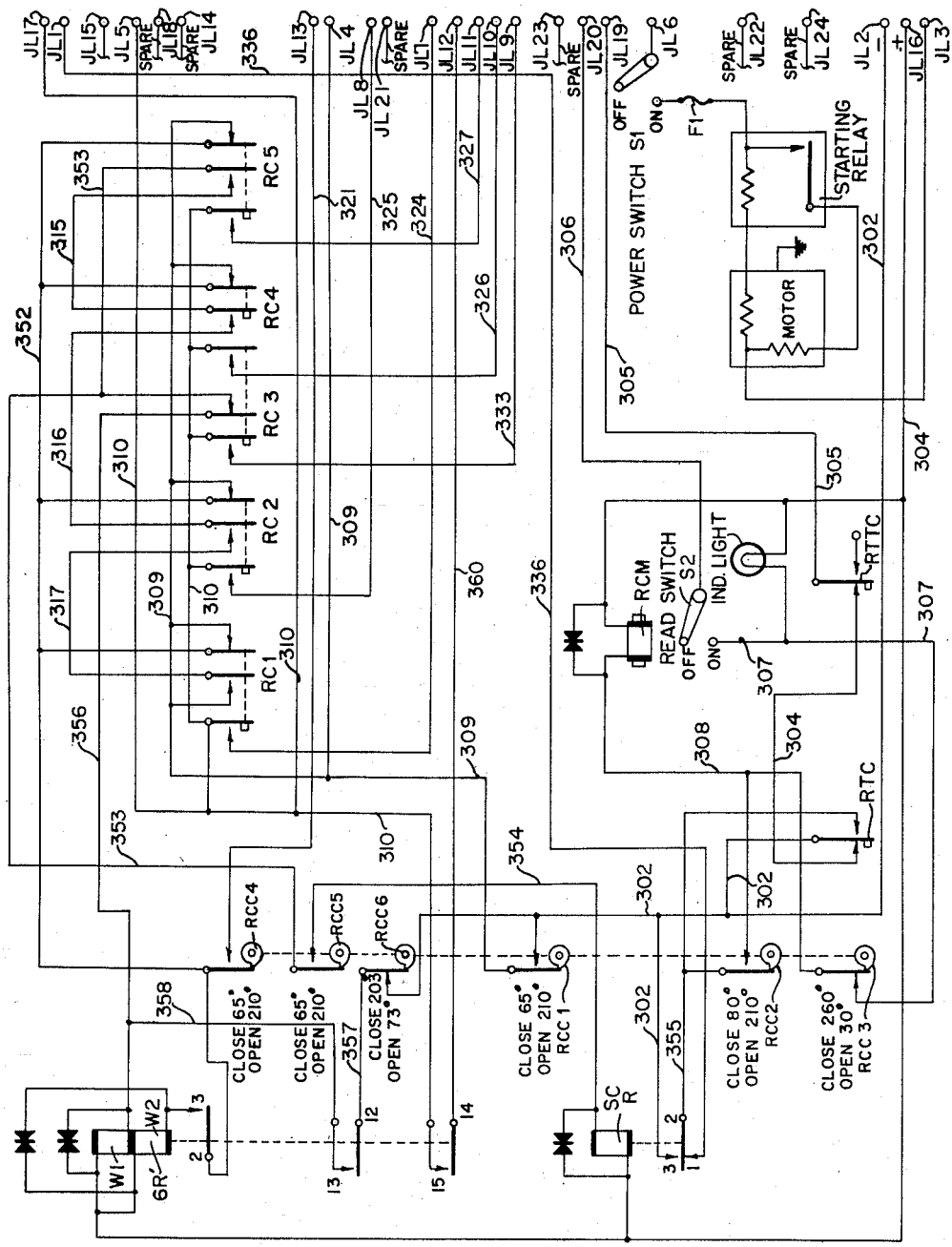

Figs. 4, 5, 6, and 7 illustrate two forms of clutch construction employed in the motorized unit;

Figs. 8–12 illustrate the construction of a tape punch unit suitable for use in a converter embodying the invention;

Fig. 13 graphically represents certain timing relationships involved in the operation of the tape punch unit;

Figs. 14–18 illustrate the construction of a tape reader unit for suitable for use in a converter embodying the invention;

Fig. 19 graphically represents certain timing relationships involved in the operation of the tape reader unit;

Fig. 20 represents the electrical control circuit of the motorized reader unit and Fig. 21 that of the punch unit embodying the present invention in one form, and Fig. 22 represents the manner in which Figs. 20 and 21 should be considered together as a unitary structure;

Fig. 23 is a representative code suitable for use in a converter embodying the invention; and Fig. 24 is the electrical control circuit of a motorized reader unit which may be used in another form of the invention, and Fig. 25 represents the manner in which Figs. 21 and 24 should be considered together as a unitary structure.

General

Figure 1:
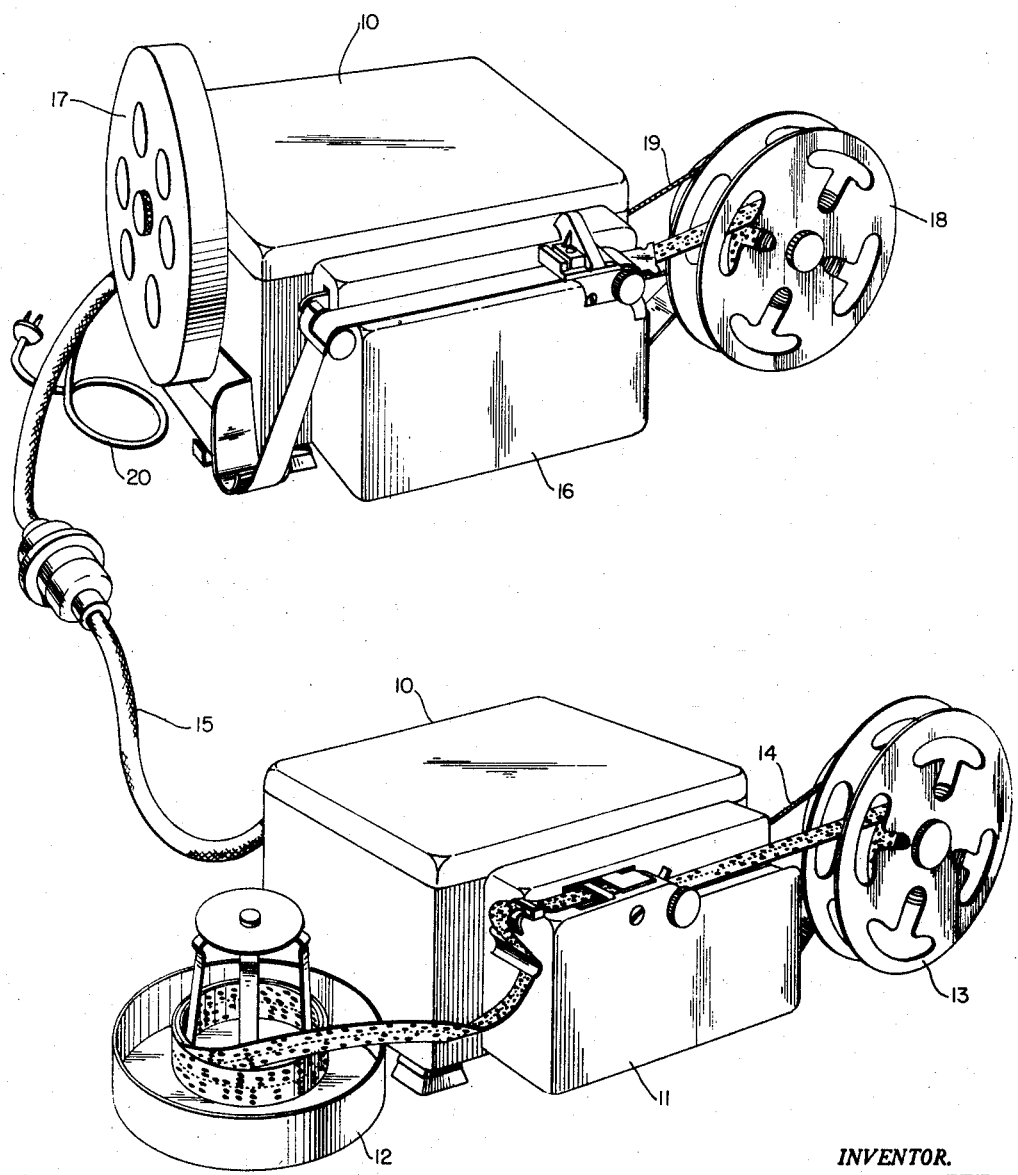
Fig. 1 illustrates a complete code converter embodying the present invention and including a motorized tape reader unit and electrically interconnected motorized tape punch unit.

Fig. 1 illustrates a complete code converter which receives information recorded on a punched tape by use of a six bit code and automatically re-records the same information by producing a punched tape having a five bit code, or conversely receives information recorded by use of a five bit code and re-records the information on a punched tape using a six bit code.

The code converter here illustrated uses two motorized units 10, 10 having a construction shown and described in detail hereinafter. One of these motorized units includes a suitable motor which is connected through an electromagnetically controlled clutch to drive a punched tape reader unit 11 to read the information recorded on the tape. To this end, a rotatable tape reel 12 receives a coil of tape to be read, and the tape after passing through the reader unit 11 is wound onto a take-up reel 13 driven by a spring belt 14 from the drive shaft of the motorized unit.

This motorized reader unit reads the information recorded on the tape and transmits it by means of an electrical cable 15 to the second motorized unit which similarly includes an electric motor mechanically connected through an electromagnetically operated clutch to drive a punch unit 16. The punch unit 16 employs a different punch code than used in recording the information read by the reader unit 11, and re-records the information by punching a blank tape supplied from a tape reel 17 through the punch unit 16 to a take-up reel 18 driven by a spring belt 19 from the motorized unit 10.

The constructions of the motorized units 10, 10 and of the reader unit 11 and punch unit 16 will be shown and described in detail hereinafter, but for the moment it may be stated that the two motorized units 10, 10 involve an essentially similar construction differing only in detail and each includes a suitable drive motor belt-connected through an electromagnetically controlled clutch to a drive shaft which drives the reader unit 11 or punch unit 16. Each motorized unit may include one or more cam actuated contacts mechanically driven from the drive shaft of the unit, may include one or more circuit control relays, and may also include a power supply for its own energization and if desired for energization of the associated motorized unit. Energization of the power supply and motor of the motorized unit is conventionally from 110 volt or equivalent power line supply through a flexible power cord 20 individual to either motorized unit or common to one and supplying complete energization to the other.

Motorized drive unit

Figure 2:
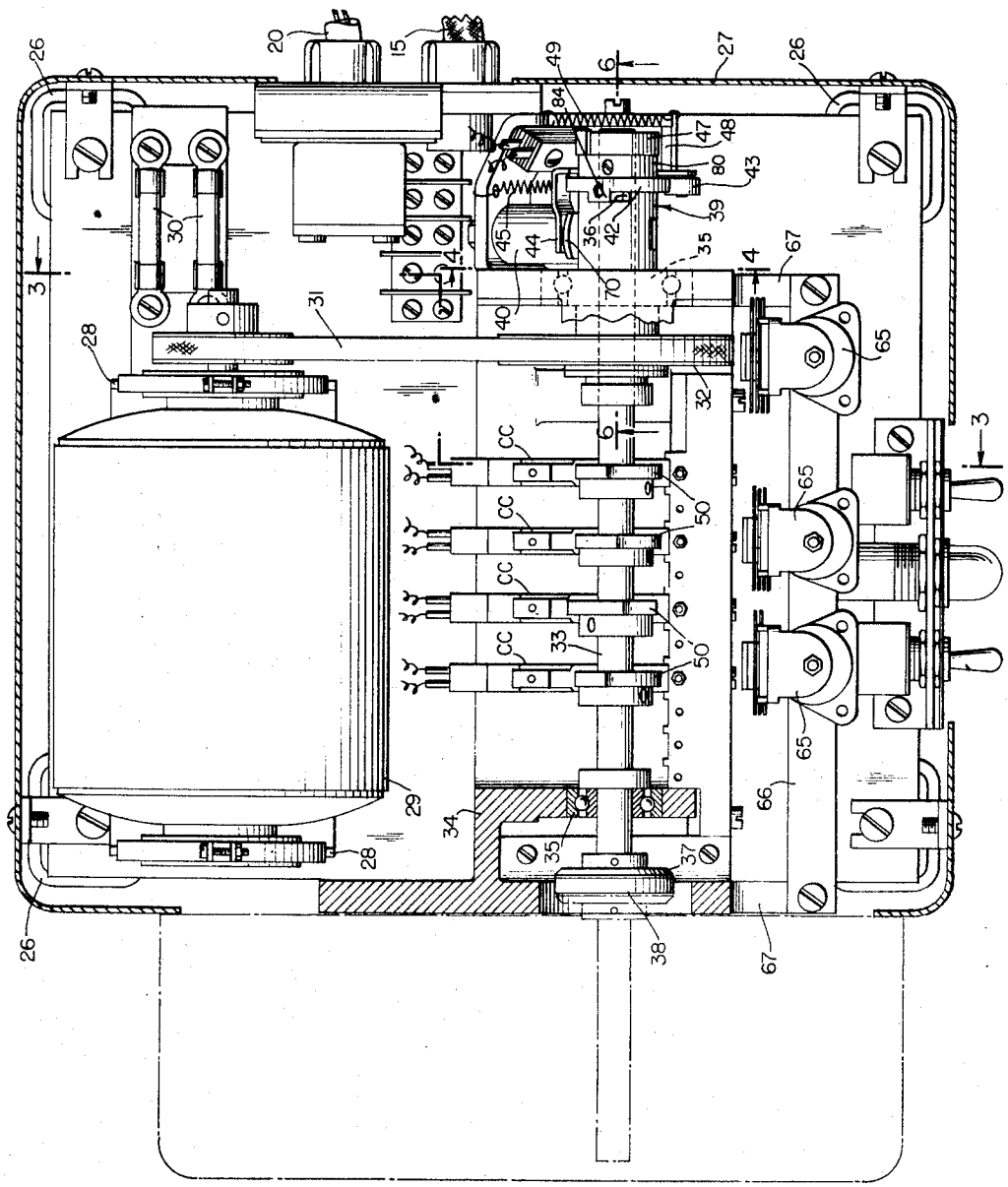
Figs. 2 and 3 illustrate in respective plan and elevational views the general construction of the motorized unit used with both the tape reader and punch units.
Figure 3:
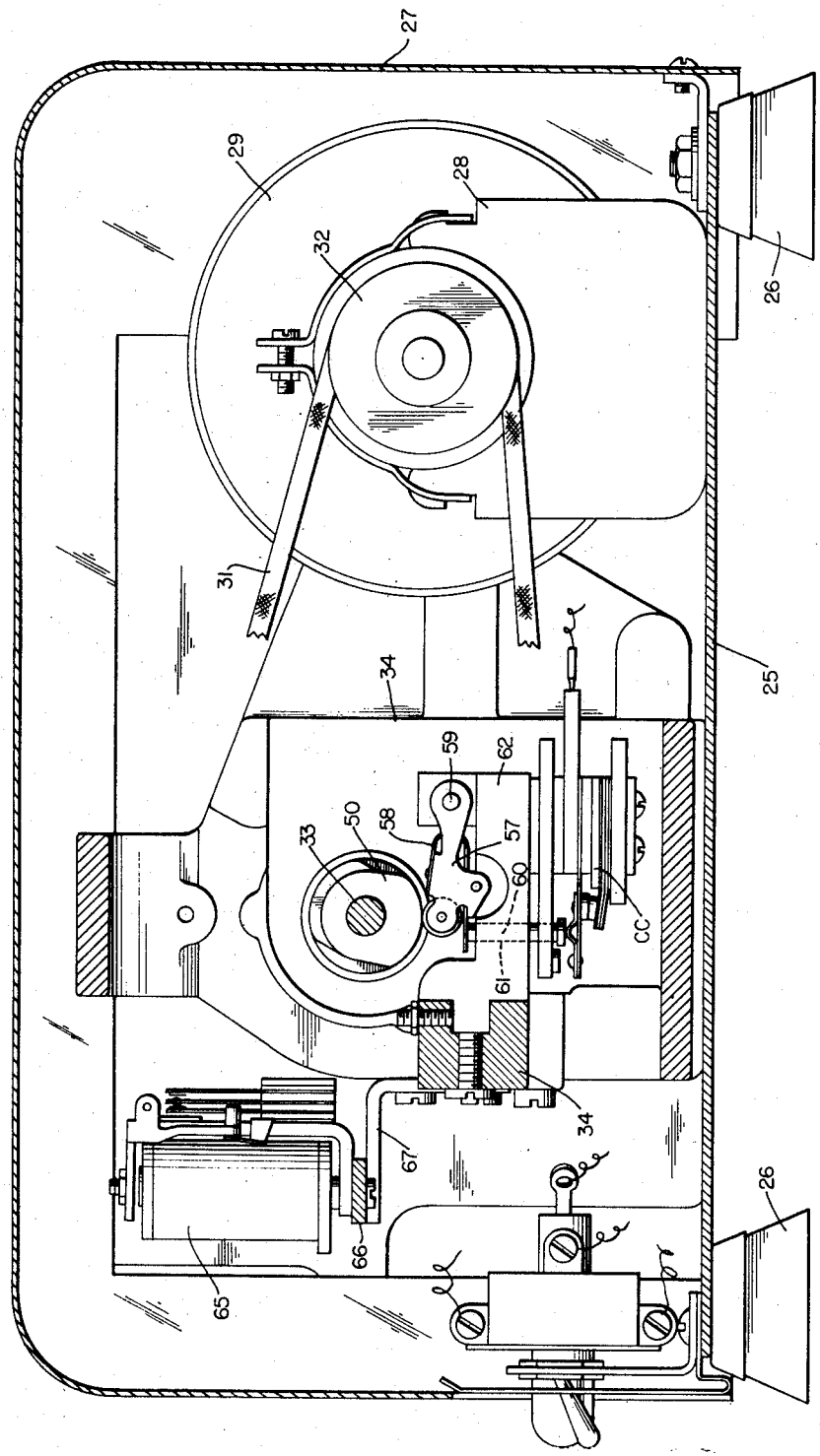

Fig. 2 is a plan view and Fig. 3 an elevational view illustrating the construction of the motorized unit. The form of unit here shown is that for use with a tape reader unit, and differs only in minor details from that used with the tape punch unit. It includes a base plate 25 supported upon resilient feet 26, and is enclosed within a metallic housing 27. Supported on the base plate 25 by support trunnions 28 is an electric drive motor 29 energized through fuses 30 from the power cord 20 or energized through the cable 15 from another similar motorized unit as will be explained hereinafter. The motor 29 is mechanically connected by a belt 31 to a drive pulley 32 rotatably journaled upon a driven shaft 33. The driven shaft 33 is supported in a casting 34 by ball bearings 35, 35, and includes at one end one flange 37 of a flexible coupling 38 through which the associated reader unit or punch unit is driven. The other end of the shaft 33 has positioned thereon a clutch 39 which is controlled by an electromagnet 40, the clutch 39 being driven by the pulley 32 and being effective under control of the electromagnet 40 mechanically to couple the pulley 32 to the driven shaft 33. The clutch 39 has one of two forms depending upon whether the motorized unit is used with a tape reader or a tape punch, and both forms of clutch are shown and described in detail hereinafter. A cam 42 is fixed by a set screw to the driven shaft 33, includes radially disposed keys 84 engaging elongated circumferential slots 36 in the clutch housing, and is engaged by a cam follower 43. The latter actuates a pivoted armature knock-off arm 44 normally biased by a spring 45 out of engagement with the armature.

Fixed to the end of the shaft 33 is a detent 47 engaged by a keeper 48 spring biased into detent engagement by a spring 49.

There are fixed to the shaft 33 in spaced relation along its length a plurality of cams 50 which may vary in number from three to six depending upon the use of the motorized unit. The cams 50 actuate individual contactors CC used for circuit control purposes, as will presently be explained more fully, during preselected angles of rotation of the shaft 33 as determined by the contour of any given cam. As shown more clearly in Fig. 3, each of the cams 50 is engaged by a cam follower 57 which is biased into cam engagement by a spring 58, the cam followers being pivoted at 59 and actuating the contacts CC through a push rod 60 slidably mounted in an aperture 61 of a casting 62. The latter is supported for a unitary assembly, which includes a cam follower with associated push rod and contacts and is itself secured at its forward end to the casting 34 as shown.

When the motorized unit is used to drive a tape reader, a plurality of relays 65 are supported upon a bar 66 secured by brackets 67 to the casting 34.

Figure 4:
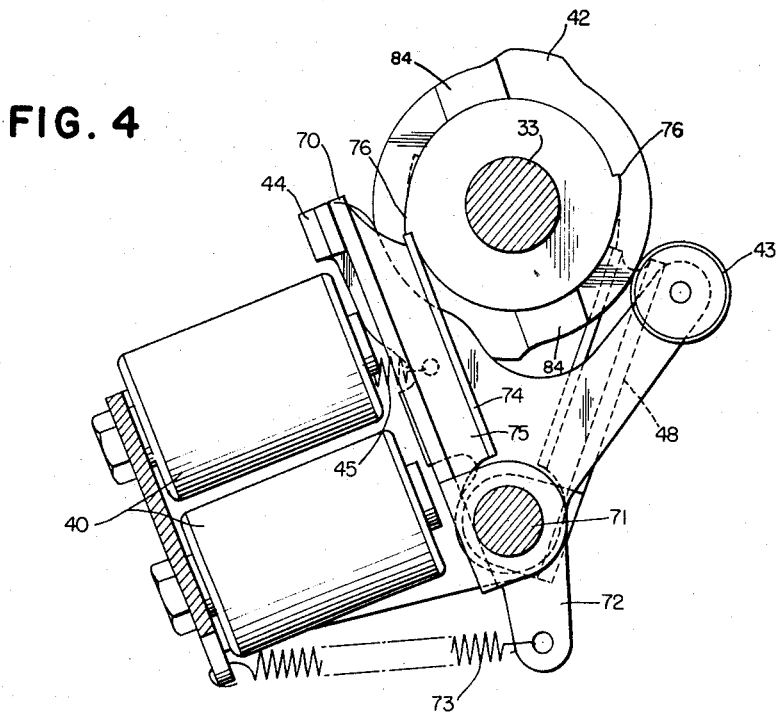
Figure 5:
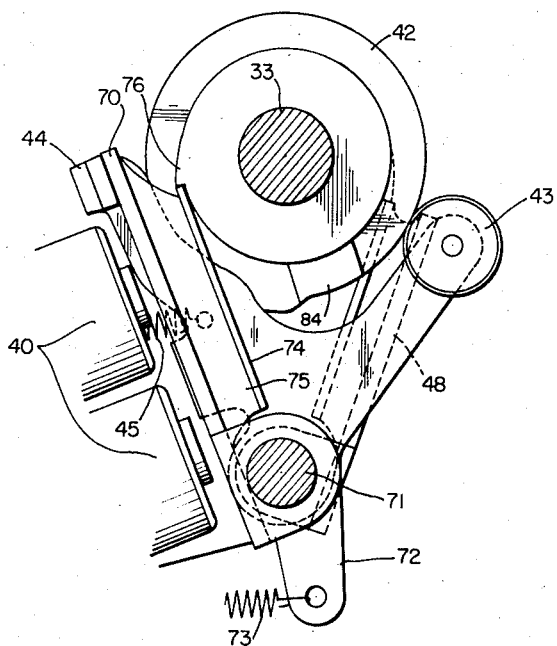
Figure 6:
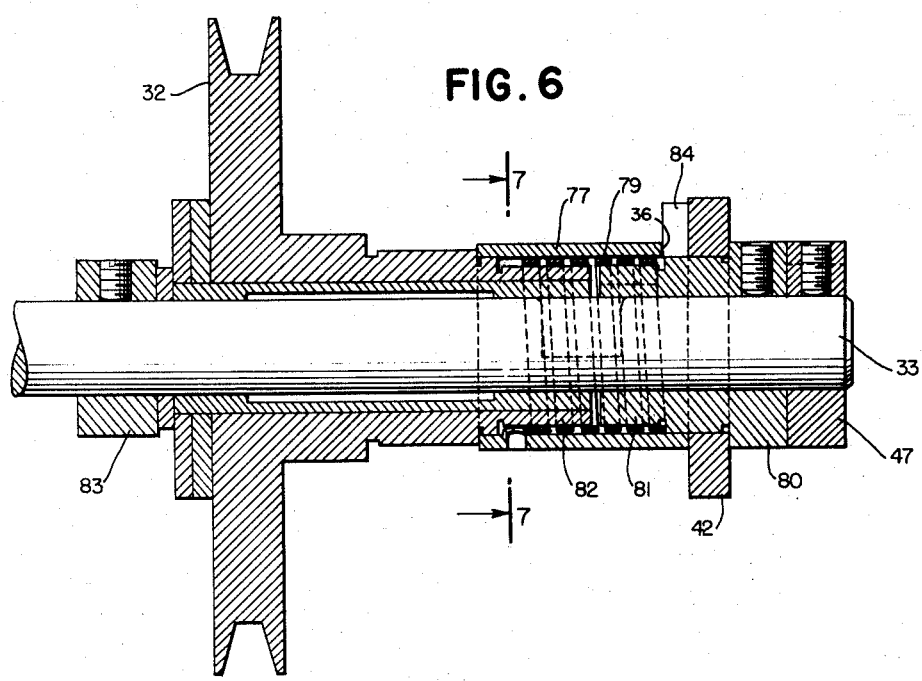
Figure 7:
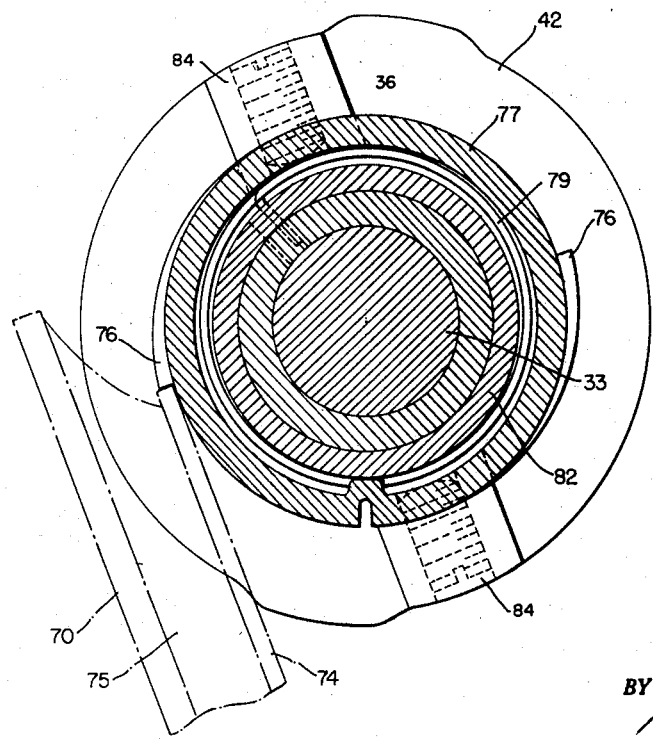

Fig. 4 illustrates the construction of the clutch 39 used in the motorized unit when the latter drives a tape reader, and Fig. 5 the clutch construction when the motorized unit drives a tape punch. Fig. 6 illustrates in cross-section the construction of both forms of clutch, and Fig. 7 is an enlarged cross-sectional view of the clutch used with the tape reader. Both forms of clutch are essentially similar with the difference that the tape reader clutch is arranged to be declutched at each 180° of rotation of the driven shaft 33 whereas the tape punch clutch is arranged to declutch at each 360° of rotation of the driven shaft.

Each form of clutch includes an armature 70 pivoted on a fixed shaft 71 and including an extended arm 72 which is engaged by a spring 73 to bias the armature to deenergized position where a detent plate 74, supported from the armature 70 by a bonded resilient rubber block 75, engages clutch detent perturbance 76 provided on the periphery on the clutch housing 77. It will be noted from Fig. 4 that the reader clutch includes two such clutch detent perturbances 76, 76 and that there are two similar detents on the member 47 engaged by the keeper 48. The punch unit clutch, on the other hand, includes only one detent perturbance 76 and there is only one detent on the member 47 engaged by the keeper 48. As shown more clearly in Figs. 6 and 7, each form of clutch is otherwise of conventional helical spring construction in which a helical spring 79 has one end engaging an inward projection of the clutch housing 77 and the other end anchored to a bushing 80 fixed to the driven shaft 33. The bushing 80 has an end 81 extending within the helical spring 79 in opposing relation to the extended end 82 of the pulley 32 which is journaled to rotate freely upon the shaft 33, the pulley being retained in position longitudinally of the shaft by a collar 83 fixed to the shaft.

As mentioned above, the cam 42 includes a key 84 which engages a circumferentially elongated slot 36 in the clutch housing 77 for mechanically limiting the overtravel rotation of the driven shaft relative to the clutch housing. Set screws are provided for adjustably positioning the cam 42 on the bushing 80, and the latter also is provided with set screws by which its angular position may be adjusted relative to the peripheral stop detents 76 on the clutch housing to provide proper clutch action between the stop detents and the driven shaft 33. Similarly, the detent 47 is provided with set screws by which angularly to position the zero or home position of the driven shaft 33 relative to the angular declutching position of the clutch 39. In considering briefly the clutch operation, assume that the clutch has just been released by energization of the clutch magnet 40 to move the detent plate 74 out of engagement with a detent perturbance 76. Upon release of the detent perturbance, the clutch housing 77 is rotated forward through a small angle by the tensioned spring 79 and the elongated slot 36 in the clutch housing permits this movement without engaging the rear end of the slot with the key 84 of the cam 42. This movement of the clutch housing 77 permits the helical spring to grip the ends 81 and 82 of the respective bushing 80 and pulley 32 and thereby impart driving force from the pulley 32 to the bushing 80 and driven shaft 33. The clutch housing 77 is subsequently stopped by engagement of the detent plate 74 with a detent perturbance 76, but the momentum of the driven shaft 33 and components fixed thereto causes the shaft 33 to continue movement until the keys 84 strike the forward ends of the slots 36 of the now stationary clutch housing 33. This continued movement of the shaft 33 causes the bushing 80 to unwrap the spring 79 from the ends 81 and 82 of the bushing 80 and pulley 32 thus terminating the driving connection. The stopping action on the shaft 33 is accordingly somewhat cushioned by the deceleration of the shaft as a part of its momentum is converted into tensioning of the helical spring 79. After being brought to a stop by engagement of the keys 84 with the ends of the slots 36, the tensioned spring 79 causes the shaft 33 to rotate backward a slight amount to engage the detent 47 with the keeper 48 at the zero or home position of the driven shaft 33.

Tape punch

The tape punch 16 shown in Fig. 1 is driven from and is removably mounted on the motorized unit 10. The construction of the punch is best shown by the side elevational view of Fig. 8 and the plan view of Fig. 9, and certain features of its construction are detailed in Figs. 10, 11 and 12.

The punch includes a cam shaft 88 which is provided at one end with a coupling flange 89 forming one element of the flexible coupling 38 by which the cam shaft 88 is driven from the driven shaft 33 of the motorized unit. The cam shaft 88 makes one revolution each punch cycle under control of the magnetically operated clutch hereinbefore described in connection with Fig. 5. The tape from the supply reel 17 (Fig. 1) passes over the top of the punch unit as indicated in dot-dash lines and the code holes are punched upwardly at the punch station located at the front of the punch unit for convenient manipulation and observation of the tape by the operator. The tape is fed for spacing of the code holes by a pin wheel which turns a fraction of a revolution each punch cycle, and the pin wheel may be manually turned by a knob positioned externally of the punch housing for purposes of moving the tape in either direction. The tape may be easily inserted edgewise into the punch, and is held in engagement with the pin wheel by a hold down pressure guide.

The particular code holes to be punched in the tape at any given punch cycle are selected by energizing selectable ones of a plurality of punch magnets 90 which number either 5 or 6 depending upon the particular code form to be punched as hereinafter explained. These magnets are identified in connection with the electrical control circuit later described as magnets PM1 through PM6. Each magnet, by attracting its armature releases a corresponding punch lever latch. During the initial part of the cam shaft rotation, the punch lever latches which were released are locked in their released position, and the ones which were not released are locked in their normal unreleased position.

Figure 9:
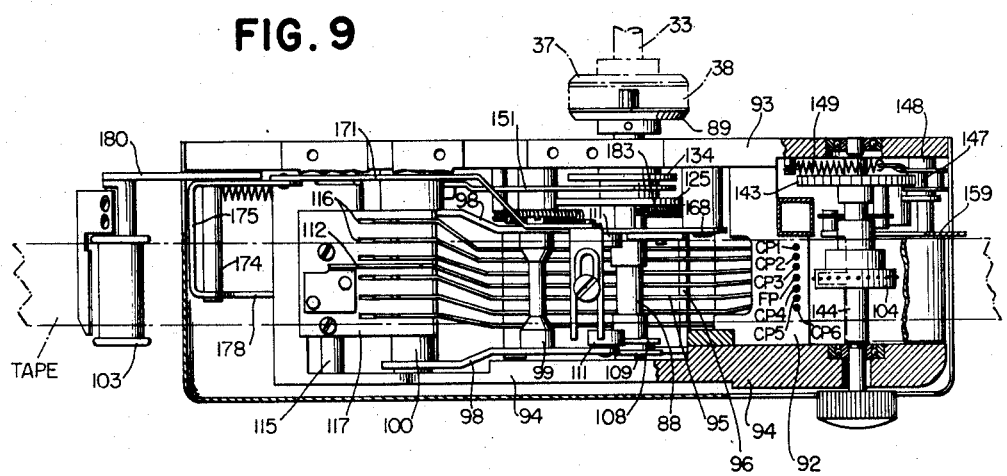

As shown more clearly in Figs. 8 and 9, the punch station comprises vertically arranged code hole punches here shown as six in number and identified as CP1 through CP6 corresponding to the six hole positions of the six bit code system employed in one aspect of the invention. It will be understood throughout the following description of the tape punch that while a six hole punch is here illustrated by way of example, and comprises the punch unit by which to reconvert information from five bit code form to six bit code form, the invention also contemplates the use of this code punch by which to convert information from six bit code form to five bit code form merely by keeping open the energizing circuit of one punch control magnet. The vertical code punches are arranged beneath and in a transverse row across the tape punching station where code data is recorded. The tape punch also includes a vertically disposed feed hole punch FP which is located between the code punches CP3 and CP4 and which functions during each operating cycle of the punch to punch the relatively small tape feed holes which are located in all punch columns of the tape and are drivingly engaged by the pins of the pin wheel.

Figure 10:
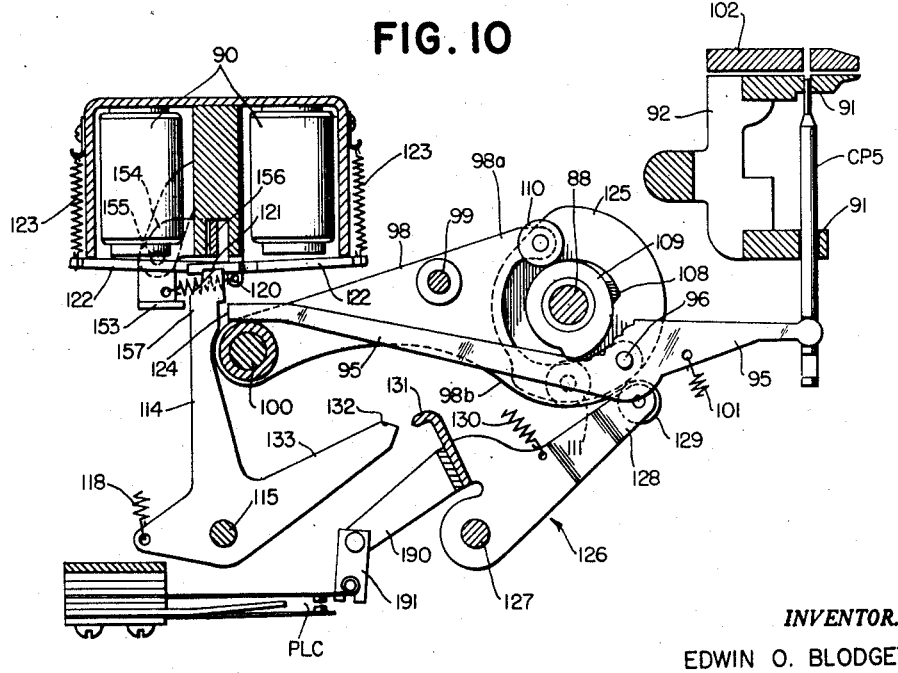

As shown in Figs. 8 and 10, each code punch CP1—CP6 is mounted for vertical reciprocatory movement in spaced aligned guide passages 91 in a fixed guide block 92 mounted between a back casting 93 and a front casting 94. The lower end of each punch is pivotally connected in a suitable manner to the right-hand end of a related punch actuating lever 95, and the lever 95 is pivoted intermediate its ends on a rod 96 which extends transversely of and forms a part of the punch operating frame 97 shown in Fig. 11. The operating frame 97 also includes spaced side arms 98 joined by a spacing sleeve 99 and pivotally supported on a transversely extending stop rod 100 which is suitably fixed at its ends to the rear casting 93 and front casting 94 of the punch. That end of all of the punch actuating levers 95 which are remote from the punches rest on top of the stop rod 100 with the punches in their normal or inactive position. A tension spring 101 is provided for each punch actuating lever 95 constantly to urge the lever 95 and its associated code punch to their inactive or withdrawn position at which the punch is withdrawn from the mating punch hole in a die block 102. It will be understood that the construction described as applicable to the code punches is equally applicable to the feed hole punch FP, the described actuating construction for each of the several punches being arranged in side-by-side relation as shown in the drawings.

As more clearly shown in Fig. 10, the lower face of the die 102 is spaced from the upper face of the guide block 92 to provide a passage through which a tape is fed lengthwise or left to right. The tape is also guided in its lengthwise movement across the top of the punch by a rearwardly positioned guide roller 103 as shown in Figs. 8 and 9. After being punched the tape passes over a pin wheel 104 having pins 105 fitting within the feed holes formed by the feed hole punch FP. The pin wheel 104 is indexed once for each operating cycle of the punch so as to advance the tape to the next blank record column, as will be explained more fully hereinafter.

The cam shaft 88 is suitably journaled at its ends in the rear casting 93 and front casting 94 of the punch, and includes a plurality of control cams 106, 107, 108 and 109 fixedly mounted thereon. Each revolution of the shaft and the cams thereon effects an operating cycle of the punch, and each operating cycle is initiated by engaging the punch clutch earlier described in connection with Fig. 5 of the motorized unit. It will be recalled that this clutch mechanically connects the drive motor to the operating shaft 33 for one revolution and the driving connection provided by the clutch is interrupted to stop the driven shaft 33 and cam shaft 88 home or inactive position shown in the drawings.

The two pairs of cams 108 and 109 are substantially complementary, and are engaged by respective followers 110 and 111 which are located in spaced relation as shown in Fig. 10 on the outer forked ends 98a and 98b of each arm 98. From an examination of Figs. 8, 10 and 11, it will be apparent that each time a punch operating cycle is effected by rotating the shaft 88 one revolution counterclockwise, the cam 108 engaging the follower 110 will first move the operating frame 97 upward or counterclockwise about its pivot rod 100, the cam 109 being so shaped as to permit such upward movement. Thereafter the cam 109 by its engagement with the follower projection 111 will insure movement of the operating frame 97 downwardly and back to the rest position shown, the cam 108 being so shaped as to permit such return movement of the frame 97. Identical cams 108 and 109 are provided with duplicate arms 98 and cam followers 110 and 111 at opposite sides of the frame 97 to insure even movement of the frame and prevent warping of the frame as it moves up and down.

During such upward and downward movement of the frame 97, the rod 96 on which the punch actuating levers 95 are pivoted, is also moved upward and then restored to the position shown. It will be apparent that if, during such movement of the rod 96, the lefthand ends of all punch actuating levers 95 are not held down against the stop rod 100, such actuating levers will be moved by the rod 96 clockwise about their pivotal connections with their related punches, the springs 101 being sufficiently strong to hold the right-hand ends of the levers 95 stationary. On the other hand, if the left-hand end of any of the punch actuating levers 95 is held down against the fixed rod 100, the upward movement of the rod 96 will then effect a counterclockwise movement of the lever or levers so held, the levers pivoting about the stop rod 100 and in so doing the punch connected to each lever so held will be moved upward against the force of its spring 101 and through the tape. Each punch thus moved accordingly punches a code hole in the corresponding code position of the tape in the case of the code punches and punches a feed hole in the tape in the case of the feed punch. As indicated graphically by curve B of Fig. 13, the actuating levers 95 actuate their associated punches from 101° to 243° of each punch cycle.

In the construction shown, the lever 95 corresponding to the feed punch FP is permanently held down against the stop rod 100 by the outer end of an arm 112 fixed at its other end to a fixed frame member 113. Thus for each revolution of the shaft 88, a feed hole will be punched in the tape in the manner explained.

The code designations are punched in the tape by the selective latching against the stop bar 100 of the adjacent ends of those actuating levers 95 which are connected to the code punches corresponding to the code position where it is desired to punch the code holes. Selective latching of the actuating levers 95 against the stop rod 100 is effected by the selective releasing of a corresponding latch lever 114. The releasing of each such latch lever is controlled by the selective energization of a corresponding punch magnet 90. The latch levers 114 are arranged in side-by-side relation and are pivoted on a transverse fixed rod 115. The upper ends of the latch levers extend through individual ones of a plurality of slots 116 of a comb plate 117 fixed to the frame member 113, and the latch levers are aligned with the adjacent ends of their associated code punch actuating levers 95 which also extend through corresponding ones of the slots 116 of the comb plate 117. Each latch lever 114 is biased clockwise by a tension spring 118 extending between an arm projection on the latch lever and the flange of a transverse fixed frame plate 119. In the normal or inactive position of the parts as shown, each latch lever 114 is held against clockwise movement around its pivot point 115 by its upper pointed end 120 engaging the right hand end of a latching notch 121 cut in the underface of the pivoted armature 122 of its related selector magnet 90. A tension spring 123 holds each armature 122 in the latching position shown.

When any of the selector magnets 90 are selectively energized, in a manner which will be explained hereinafter, its armature 122 is attracted and moves upward to release its associated latch lever 114. The latter is moved by its spring 118 clockwise to a point where a latching notch 124 of the latch lever engages the left hand end of an associated punch actuating lever 95, thereby to hold the engaged actuating lever down against the stop rod 100. Subsequent rotation of the operating shaft 88 and the cams 108 and 109 moves the frame 97 counterclockwise around the rod 100 and causes the bar 96 to move the right hand end of the engaged latch lever 95 upwardly and thereby actuate its associated punch to punch a code hole in the corresponding code position of the tape.

The selector magnets 90 are positioned in staggered relation transversely of the punch unit so that their armatures are aligned with an associated one of the latch levers 114. The free ends of the armatures of adjacent selector magnets are thus positioned in side-by-side relation but overlap at their outer ends so that their latching notches 121 are aligned in a transverse horizontal plane when the parts are in the inactive position shown.

During each operating cycle of the tape punch, a cam 125 on the cam shaft 88 functions to lock in tripped position those latch levers 114 which have been tripped by their associated selector magnets, and also functions to lock in untripped position the untripped latch levers so that they cannot interfere with the punching operation during the punch cycle. To this end, a latch lock bail lever 126 is rotatably mounted on a transverse rod 127 suitably fixed between the back casting 93 and front casting 94 of the punch. The lever 126 includes a follower arm 128 carrying a roller 129 which is constantly urged against the face of the cam 125 by a tension spring 130 connecting the arm 128 with a stud on the back casting 93. The bail lever 126 carries a lock bail or anvil 131 extending transversely across the spear-shaped ends 132 of arms 133 integrally formed on the latch levers 114. After the latch levers 114 are released by their associated magnets, the cam 125 and spring 130 move the locking bail or anvil counterclockwise about the rod 127 and toward the ends 132 of the latch lever arms 133. As a result of such movement, the anvil 131 will pass beneath the points of the ends 132 of any untripped latch levers and will engage the lower inclined surface thereof and thereby lock such untripped levers in their inactive positions. The ends 132 of any latch levers which had been previously tripped will then be so positioned that the locking bail or anvil 131 will pass above the points of such ends and will engage the upper inclined surface thereof and thereby lock any such tripped levers in latching relation with respect to their associated punch actuating levers 95. Locking of the latch levers begins at 65° and ends at 240° of each punch cycle as indicated graphically by curve A of Fig. 13.

A cam 134 positioned on the shaft 88 functions during each punch operating cycle to advance the tape feed pin wheel 104 by an amount sufficient to move the punched record column of the tape out of punching position and move a blank record column thereof into punching position. As shown more clearly in Fig. 12, a lever arm 135 carries a follower roller 136 engaging the feed cam 134 and is pivoted to a fixed stud 137 on the rear casting 93. The arm 135 has pivoted to its right hand end a feed pawl 138. A stud 139 on the pawl 138 is engaged by a tension spring 140 connected at its opposite end to a stud 141 on the lever arm 135. A tension spring 142 urges the follower 136 upward and against the face of the feed cam 134. A ratchet wheel 143 is fixedly positioned on a shaft 144 on which the pin wheel 104 is also fixed, and the U-shaped upper end of the pawl 138 engages the teeth of the ratchet wheel 143 when the arm 135 is rotated counterclockwise by engagement of the cam follower 136 with the lobe of the cam 134. It will be apparent that when the shaft 88 and cam 134 rotate, the cam follower 136 is so moved by the lobe of the cam that the arm 135 will rotate in a counterclockwise direction and move the pawl 138 upward to engage a new tooth of the ratchet wheel 143, the tension spring 140 allowing the pawl to rotate in a clockwise direction about its pivot 145 as the end of the pawl moves up the inclined slope of the ratchet wheel tooth. Thereafter further movement of the cam 134 allows the arm 135 to move clockwise under action of the tension spring 142, and this moves the pawl 138 downward thereby rotating the ratchet wheel 143 by the distance of one tooth at which point the U-shaped end of the pawl 138 strikes a fixed stop member 138a to wedge or jam the pawl against the teeth of the ratchet wheel 143 and assure a positive stop of the latter without overtravel. The ratchet wheel and tape feed pin wheel 104 are accordingly indexed clockwise to provide the desired step-by-step tape movement earlier mentioned. Each tape feed cycle begins at 223° and ends at 348° of the punch cycle as graphically indicated by curve D of Fig. 13.

A detent lever 146, pivoted on a pivot stud 147 carried by the back casting 93, carries a detent roller 148 which is adapted to engage the teeth of the ratchet wheel 143. A tension spring 149 maintains the detent roller 148 in contact with the teeth of the ratchet wheel 143 and thereby stablizies the operation of the tape feed mechanism.

Immediately after a punching operation, the latch levers are restored to their inactive or latched positions shown where they are held by the latching notches 121 of the armatures 122 of their associated magnets 90. This is effected by a restoring bail 150 (Fig. 12) extending across the lower side of the arms 133 of all latch levers 114. The bail 150 is formed integrally with an arm 151 and the latter is journaled at one end on the fixed rod 115 and is adapted to be engaged at its other and outer end by an eccentrically mounted roller 152 supported upon a stud extending between and fixed at its ends to the tape feed cam 134 and the locking bail cam 125. During the mid part of the punch cycle, the locking bail 131 having been restored to inactive position, the eccentric roller 152 engages the outer end of the arm 151. As a result, the arm 151 and bail 150 are moved counterclockwise about the rod 115 and the bail 150 engages any previously tripped latch levers 114 and moves them counterclockwise and slightly past the latching position shown in Figs. 8 and 10. In moving the previously tripped latch levers past their latching position, the bail 150 will also engage and move the remaining or untripped latch levers 114 counterclockwise. As the latch levers are thus moved counterclockwise, one of the levers engages a bail element 153 (Fig. 10) forming part of a knock-off bail lever 154 which is pivoted on a rod 155. The knock-off lever 154 also includes a second bail element 156 which is mounted above and extends across the outer ends of all of the armatures 122 of the punch magnets 90. The knock-off lever 154 is biased by a tension spring 157 counterclockwise to a position of rest, so that engagement of any latch lever 114 with the bail element 153 causes the knock-off bail lever 154 clockwise to cause its bail 156 to engage and release any of the armatures 122 that may stick in energized position thus insuring that all of the armatures will be positioned in latching relation against the ends 120 of their associated latch levers and be held there by their associated springs 123. The latch lever restoring bail 150 is then permitted by the further rotation of the eccentric roller 152 to return to the position shown, and in so doing the springs 118 move their associated latch levers 114 clockwise until their upper pointed ends 120 again engage the right hand wall of the notches 121 of their associated armatures and are thereby held in latched position. The latch restoring and armature knock-off operation begins at 172° and ends at about 307° of the punch cycle as indicated by curve C of Fig. 13.

Provision is made for disabling the tape punch in case of abnormal conditions of the tape being punched as, for example, tape breakage or exhaustion of the tape supply or excessive tape tension. Furthermore, the disabling mechanism includes a connection to a tape hold-down plate which cooperates with the tape feed pin wheel so that the punch will be disabled if for any reason the hold-down plate be moved away from the tape feed pin wheel. Specifically, a tape hold-down plate 158 (Fig. 8) is mounted to cooperate with the tape feed pin wheel 104. The hold-down plate 158 has an arcuate portion which is adapted to overlie the feed pin wheel 104 but is spaced therefrom by the thickness of the tape used. The arcuate portion of the plate 158 is slotted at the position of the feed pins of the pin wheel 104, and the plate 158 is carried by a lever 159 which is pivoted on a stud 160 extending from the rear casting 93. The lever 159 has a pin 161 extending from a face thereof and this pin anchors one end of a spring 162. The spring 162 is looped and has its opposite end anchored at a fixed stud 163 which extends from the rear casting 93 of the punch. The pivot pins of the spring 162 are so arranged as to cause the spring to exert an over-center action against the lever 159. Consequently when the lever 159 is manually moved in a clockwise direction about its pivot 160, the spring 162 will cause the lever to have a positive action as it approaches its limit of movement in a clockwise direction and then exerts a force on the lever to hold it at the clockwise limit of its movement where the hold-down plate 158 has appreciable spacing from the feed pin wheel 104. In the counterclockwise manual movement of the lever 159, a similar action results from the spring 162 whereby the arcuate portion of the hold-down plate 158 is maintained closely spaced from the feed pin wheel 104. The lower end of the lever 159 has pivoted thereto a rearwardly extending link 164 which by means of a slot 165 at its opposite end provides a lost-motion mechanical connection through a stud 166 with a downwardly projecting portion of curved lever 167 which carries the stud 166. The lever 167 is mounted for rocking motion about a pivot pin 168, and its free end 169 includes a laterally bent end portion which is adapted to lie in contact with the upper surface of a tape passing through the punch. The lever 167 includes a pin 170 which engages the slot of a rearwardly extending link 171. The connecting slot in the link 171 affords a limited amount of lost motion between the link and the pin 170. The rear end of the link 171 is connected by means of a pin 172 to a bail lever 173. The bail lever 173 is mounted for rocking motion about a pivot pin 174 extending from the lower rear corner of the rear casting 93. The bail lever 173 has a transversely extending cross member 175 which terminates in a downwardly extending arm 176 which is apertured for support by the pin 174. A forwardly extending arm 178 of the bail lever is connected through an insulating link to a flexible contact carrying leaf 179 whereby rocking movement of the arm 178 will make and break a contact PTC.

The tape guide roller 103 is carried by an upstanding lever 180 which is also pivoted on the pin 174. The lever 180 has a laterally extending arm 181 which extends behind the rear edge of the bail lever 173 and terminates in a downwardly extending arm pivoted on the pin 174. The lever 180 is positioned in alignment with the end of the link 171, so that clockwise rocking movement of the lever 180 about the pivot pin 174 will engage the left hand end of the link 171 connected to the lever 173 and rock the latter in a clockwise direction as viewed in Fig. 8 to open the contacts PTC. This rocking motion of the bail lever 173 is possible by virtue of the pin and slot connection at the forward end of the link 171. The lever 180 is normally urged in a counterclockwise direction by a tension spring 182 which connects the lower end of the lever with a stud fixed to the casting 93, and is moved clockwise against the bias of the spring 182 by any condition causing excessive tape tension. The tape engaging lever 167 is urged in a counterclockwise direction about its pivot pin 168 by a spring 183 which interconnects that lever with a stud on the back casting 93.

It will be apparent from the foregoing description that when the hold-down plate 158 is rocked away from the tape pin wheel 104 by moving it manually in a clockwise direction about its pivot 160, the lower end of the lever 159 will force the link 164 toward the rear of the punch until the end of the slit 165 engages the stud 166. Further movement of the link 164 will rock the lever 167 about its pivot 168 to raise the hooked end of the lever 167 above and out of engagement with the tape while at the same time pulling the link 171 forward and thereby rocking the bail lever 173 clockwise about its pivot 174. This movement of the bail lever 173 causes its arm 178 to open the contact PTC. With the end of the arm 167 raised above the tape as described, a tape may be readily removed from or inserted in the punch unit. Upon manual movement of the hold-down plate 158 back into its position where it effects hold-down of the tape against the pin wheel 104, the lever 167 is permitted to move counterclockwise and its bent end engages the upper surface of the tape while at the same time the lever 173 moves counterclockwise to permit the contacts PTC to close. Should the tape break or the supply of tape become exhausted, the bent end of the lever 167 is no longer supported by the tape and the lever 167 accordingly moves counterclockwise about its pivot 168 under the influence of its spring 183. This movement of the lever 167 likewise exerts a pull on the link 171 and causes the contacts PTC to open by movement of the lever 173 in a manner similar to that described above. The tension of the tape in contact with the roller 103 is normally insufficient to overcome the tension of the spring 182. However, should the tension of the tape increase for any reason to the point where lever 180 is rocked in a clockwise direction about its pivot pin 174 and against the tension of the spring 182, the lever 180 will engage the end of the link 171 to operate the bail lever 173 as previously described and rock the latter in a clockwise direction to open the contact PTC.

The lower end of each punch CP1—CP6 and the feed punch FP has a milled flat to receive a hooked end 184 of an individual reciprocating contact actuator 185 which is guided for vertical reciprocatory motion by a comb and retaining plate 186 and includes a slotted lower end 187 for receiving the insulated end portions of movable contacts 188 of ganged contacts 189. These contacts are thus positively driven in both directions of motion of the associated punch element, and may be included in a parity check contact system having an electrical continuity circuit so extending between the stationary and movable contacts of the ganged contacts 189 that a continuous electrical circuit is maintained between input and output terminals of the contacts 189 if either an odd number of punches move to punch position or an even number of punches move to punch position at each punch cycle of the punch depending upon whether the punch code selected involves an odd or even code form. A representative continuity or parity check circuit for the contacts 189 is shown in the copending application Serial No. 535,497, filed September 20, 1955, entitled Writing Machine, in the names of Edwin O. Blodgett and Wilbur C. Ahrns, and assigned to the same assignee as the present application.

While not used in the present code converter, Figs. 8 and 10 illustrate the provision of an electrical circuit control contact which is useful when the punch unit here described is used in other applications. As will be more particularly evident from Fig. 10, the bail lever 126 includes an extended end portion 190 which is mechanically connected through an insulating link 191 to the movable contact of a punch latch contact PLC by which to complete an electrical circuit through these contacts upon each movement of the bail lever 126 in a counterclockwise direction under control of the cam 125.

The punch unit is conveniently supported rigidly from the flared end of the motorized unit casting 34 (Fig. 2) by machine screws passing through the back casting 93 of the punch unit and threaded into the motorized unit casting 34.

*Tape reader unit*

The details of construction of the tape reader unit are shown in Figs. 14–18 of the drawings. The reader is here shown as one used to read a six hole code, and it will be understood that a reader for a five hole code could simply omit one of the reading pins while a reader arranged to read a code having more than six holes would include the same construction illustrated but with the required larger number of reading pins and associated actuating components.

The tape reader includes a plurality of paired electrical contacts 200 which are disposed in opposite rows on a supporting structure 201 mounted on a base casting 202. Inasmuch as the reader here described is one for reading or sensing any one of six code holes (or any combination thereof) in the read tape, there are six paired contacts 200 under the control of tape perforations and a seventh contact constituting a tape run-out contact RTC which will be described in greater detail hereinafter. The contacts in the oppositely disposed rows are arranged on the supporting structure 201 in staggered relation so that they may be individually controlled by interposer mechanism which will be more fully described at a later point. Each pair of contact devices includes fixed conductive strips 203 having contact points at their lower ends and also includes resiliently movable conducting strips 204, each of which carries a contact point in registration with the contact point or points on associated ones of the strips 203. Each resilient conducting strip 204 normally is forcibly moved against its own resiliency to close one of its associated contacts but its resiliency tends to move it to open this contact and close the other of its associated contacts. The strip 204 is restrained against doing so, except when a corresponding tape perforation appears, by means of an offset contact lever 205 which is mounted for a limited swinging movement on a pivot shaft 206 (Fig. 16) forming part of the supporting structure 201. Each of the contact levers 205 has a free end 207 which when moved outwardly causes the contact operating end of the lever 205 also to move outwardly. The contact operating end of each such lever has pivoted thereto a short outwardly extending insulating link 208 which is notched or apertured to engage an outwardly extending pin 209 of associated ones of the resilient contact strips 204. As a result of this structure, when the free ends 207 of the contact levers 205 are moved outwardly, the opposite ends of the levers also move outwardly and cause the contact points of its associated contacts to open certain contacts and close others as noted above.

The contact levers 205 are guided in their movement by a pair of guide combs 210, and the movement of these levers is partially under control of a pair of contact lever bails 211, one such bail being associated with each row of contact levers and adapted to engage the free ends 207 thereof. Thus, when the contact bail levers 211 are moved toward each other, any contact lever which is at such time otherwise free will permit its associated resilient contact strips 204 to move inwardly to close the inner contacts thereof while opening the outer contacts thereof. The contact lever bail assembly includes a pair of yoke-like members 212, each comprising a pair of laterally spaced arms 213 interconnected by the contact lever bail 211. One end of each arm is pivoted on the pivot shaft 206, and the other end of each has mounted thereon a roller 214. The contact lever bail assemblies are urged toward each other under the influence of the contact levers 205 and resilient contact springs 204, but they are kept in normally separated position by means of interposer bail studs 215 which are adapted to move between the rollers 214 at each end of the assembly. When the studs 215 are disposed between the rollers 214, the contact lever bail assembly is separated, the contact lever bails 211 are in contact with the free ends 207 of the contact levers 205, and as a consequence the inner contact points of the contacts 203, 204 are opened while the outer contacts thereof are closed.

The studs 215 are carried by an interposer bail assembly 216 which in turn is pivoted on a pivot shaft 217. The interposer bail assembly 216 includes a pair of spaced side arms on the free end of each of which is located the stud 215 and from which the latter projects into position between the rollers 214. An interposer bail 219 interconnects the side arms of the interposer bail assembly and this bail is adapted to overlie and to control a series of interposers as will more fully appear hereinafter. Furthermore, the interposer bail assembly has attached thereto an interposer bail arm 220 by means of which the forwardly projecting arms 216 may be rocked about the pivot shaft 217 on which they are mounted. The free end of the interposer bail arm 220 has a cam follower 221 mounted thereon and adapted to operate in contact with an interposer bail cam 222 which is fixed to a drive shaft 223. The drive shaft 223 has fixed on one end a flange 224 which forms one element of a flexible coupling 38 by which the shaft 223 is driven from the driven shaft 33 of the motorized unit earlier described.

Figure 14:
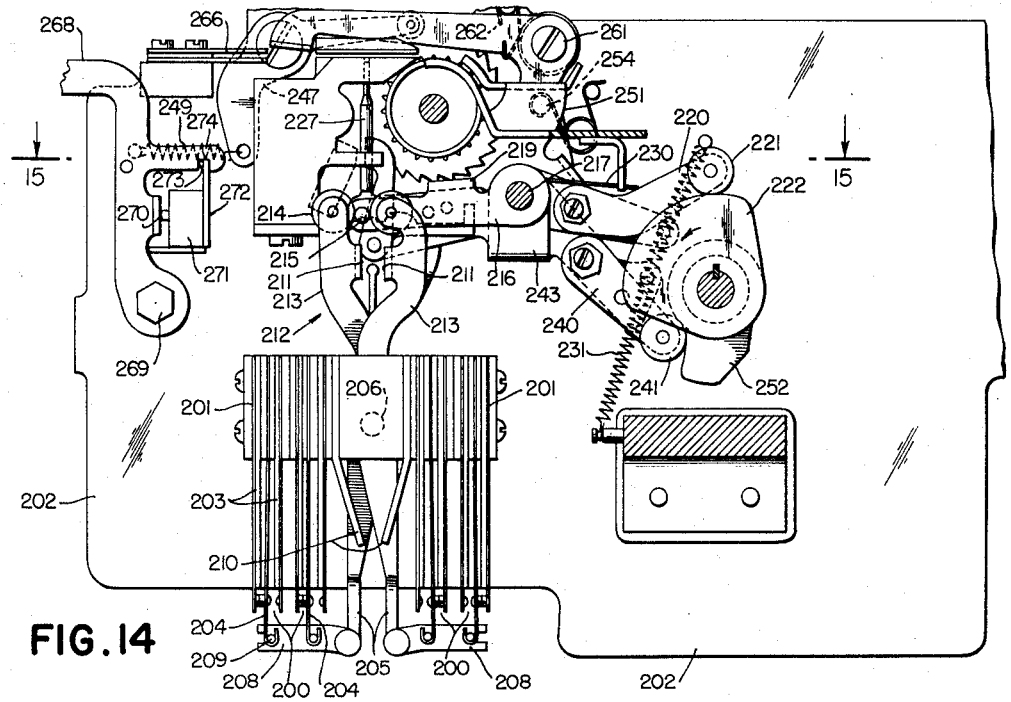
Figure 15:
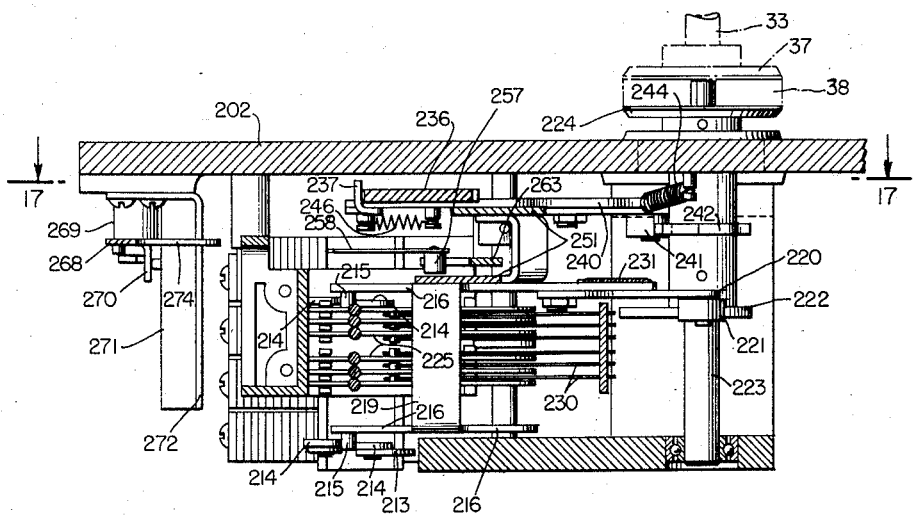
Figure 16:
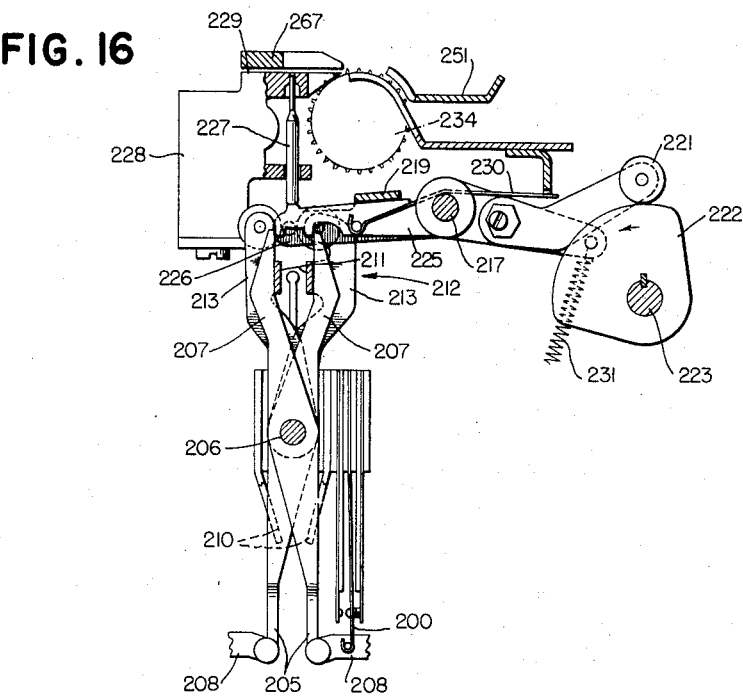
Figure 17:
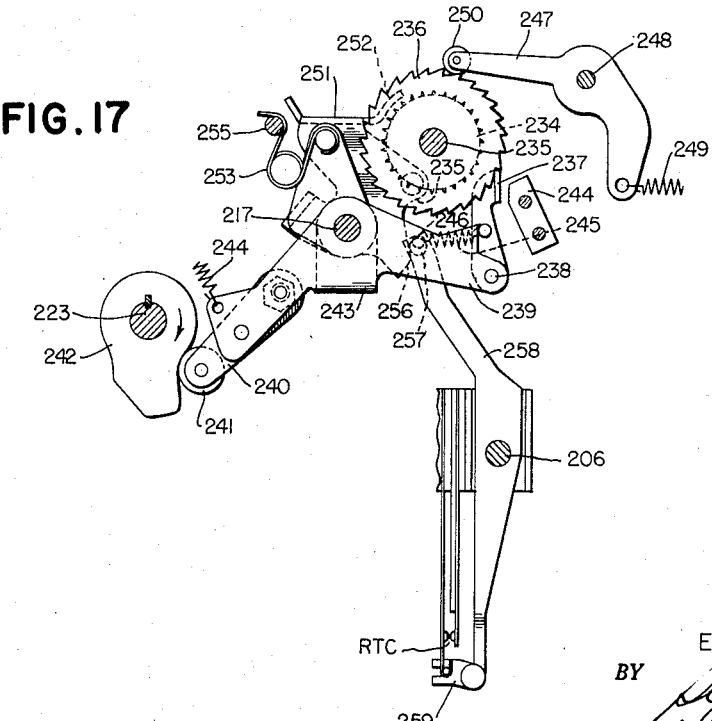

The operation of the tape controlled contact assemblies is under the ultimate control of a series of interposer arms 225 (Fig. 14) and attached tape reading pins, one such arm being provided for each tape controlled contact lever 205. The interposer arms 225 are freely pivoted on the shaft 217 on which they are mounted, and each consists of a lever having a pair of interposer shoulders 226 (Fig. 16) formed at the free end thereof. One shoulder 226 of each interposer arm is associated with the free end 207 of its corresponding contact lever 205. In the inoperative or non-reading position of the reading pins, the interposer arms are positioned as shown in Figs. 14 and 16 with one of its shoulders 226 in the path of movement of the end 207 of its associated contact lever 205 but normally slightly out of engagement therewith. It will be seen, therefore, that even though the contact lever bails 211 are released, each contact lever 205, the interposer of which is in blocking position, will be restrained and consequently its associated contacts will remain open.

Coupled to each interposer arm is a reading pin 227 which is guided for reciprocating movement in a reading pin guide block 228. The path of the reading pins 227 intersects a tape feed throat 229 in the guide block 228. As a perforated tape is intermediately fed through the tape feed throat 229, the reading pins 227 are allowed to come into light contact therewith by reason of the fact that each interposer arm 225 is under the influence of a light spring 230. The tension of the spring 230 is insufficient to cause any damage to a control tape being read. However, the spring tension is sufficient to cause a reading pin 227 to enter a tape perforation which occurs in alignment with such reading pin. When this relationship is present, the corresponding reading pin 227 will enter the tape perforation and thus cause the interposer arm 225 to swing on its pivot shaft 217 sufficiently to withdraw the blocking interposer shoulder 226 from the path of the upper end 207 of its associated contact lever 205. Under these conditions and when the contact lever bails 211 are moved inwardly away from the free ends 207 of the contact levers 205, a contact lever thus freed will move sufficiently to close its associated contact points. In the absence of a perforation in the tape corresponding to the position of a particular one of the reading pins 227, the reading pin will rest lightly on the under surface of the tape and thus prevent the associated interposer arm 225 from moving out of the path of the associated contact lever 205, thereby blocking such lever against movement and preventing the operation of its associated contacts. Whenever the interposer bail 219 is in its depressed position, the interposer arms 225 will be held in on-reading position. It will be noted that the interposer bail 219 overlies and is adapted to contact the upper edge of all of the aligned interposer arms 225.

The interposer arms 225, and consequently the reading pins 227, are restrained in non-reading position by the interposer bail 219 until the interposer bail arm 220 is permitted to drop by the cam 222 as the latter is driven from the motorized unit through the driven shafts 33 and 223. The interposer bail arm 220 drops under the influence of a tension spring 231 which maintains the cam follower 221 in contact with the cam 222. As the interposer bail arm 220 and interposer bail assembly 216 thus move clockwise about the pivot shaft 217, the interposer bail 219 is raised and the interposers 225 are permitted to rise under the influence of their respective springs 230 should their associated reading pin 227 enter any tape perforation presented by the tape in alignment with the reading pin. This permits movement of the associated contact lever 205 in the manner previously pointed out. As the interposer bail cam 222 continues to rotate, a point is reached on its contour where it moves the interposer bail arm 220 and interposer bail assembly 216 counterclockwise about its pivot shaft 217. In the final position of rotation of the bail assembly 216, the interposer bail 219 restores the interposers 225 to their normal position at which the reading pins 227 are out of contact with the tape, the interposer arms then being in position to latch the contact levers 205 and the latter being separated by contact of the contact lever bails 211 by reason of the interposition of the interposer bail studs 215 between the rollers 214. This completes a cycle of operation of the reading pin sensing action, which begins at 40° and ends at 269° of the reader cycle as indicated by curve E of Fig. 19, and succeeding such cycles occur for each revolution of the interposer bail cam 222. It will be recalled from the description of the motorized unit that the motorized unit clutch controls cycles of operation of the driven shaft 33, and it will be apparent that this in turn controls cycles of operation of the cam 222 and thus of the reader unit.

The perforations in the tape are arranged in transverse rows that are equally spaced, and the tape is moved through the reading throat 229 in step-by-step progression such that successive rows of perforation will present themselves in registry with the reading pins 227. For the purpose of achieving a regular feeding of the tape through the reading zone, there is provided a tape feeding mechanism which is shown more clearly in Fig. 17 of the drawings. The tape is provided along its length with sprocket holes which are engaged by the teeth of a tape feed pin wheel 234. The pin wheel 234 is fixed to a shaft 235 which is supported for rotation in ball bearings as indicated and is rotated by a feed ratchet wheel 236. The latter has circumferential teeth which are periodically engaged by a feed pawl 237 by which to rotate the ratchet wheel and pin wheel 234 to effect tape feed in step-by-step manner. The feed pawl 237 is pivoted at 238 on one end of a feed pawl operating lever 239. The operating lever 239 is mounted on the pivot shaft 217 for limited rocking movement thereabout, and includes an arm 240 having on its end a cam follower roller 241 adapted to contact a tape feed cam 242 mounted for rotation with the driven shaft 223. The feed pawl operating lever 239 is mechanically connected to the arm 240 by a transverse yoke 243 to provide a feed pawl assembly. The feed pawl 237 is moved through its feeding stroke by actuation of the arm 240 from the cam 242, and is returned by action of a tension spring 244, connected at one end to the arm 240 and at its opposite end to a stud in the casting 202. A stop member 244 secured to the casting 202 engages the feed pawl 237 at the upper limit of movement of the latter to wedge or jam the feed pawl against the teeth of the ratchet wheel 236 and thus assure a positive stop of the latter without overtravel. The feed pawl 237 is continuously biased into contact with the teeth of the ratchet wheel 236 by a spring 245 connected between the pawl 237 and a pin 246 on the lever 239. Each tape feed operation begins at 244° of the reader cycle, just after the reading pins are withdrawn from the tape, and ends at about 360° as graphically indicated by curve F of Fig. 19.

A feed ratchet wheel detent 247 is pivoted at 248 on a stud fixed to the support casting 202, and is biased counterclockwise by a tension spring 249 to engage a roller 250 carried on the end of the arm 247 with the teeth of the ratchet wheel 236. This detent structure provides a stabilizing action for the rotary operation of the feed ratchet wheel and consequently of the tape feed pin wheel 234.

Figure 18:
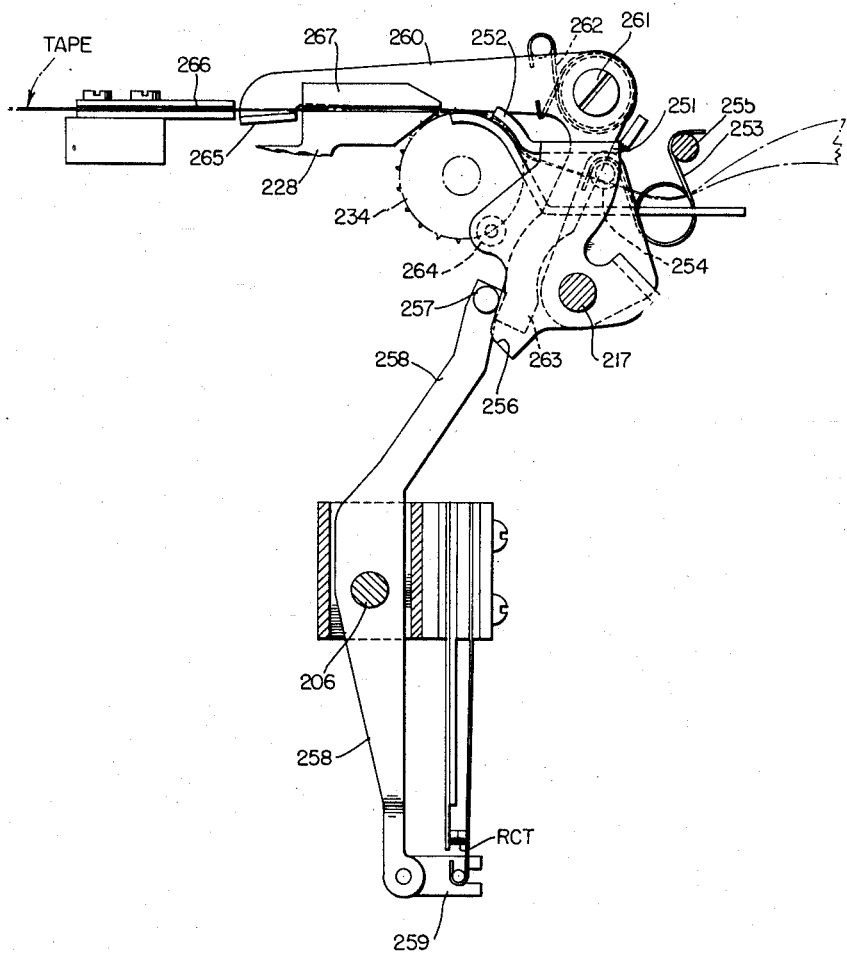

In order that the tape may be held in cooperative relation with the pin wheel 234, a tape hold-down arm 251 is provided as shown more clearly in Figs. 14 and 18. This arm has an arcuate end portion 252 positioned in spaced proximity to the pin wheel 234, serving the purpose of holding the tape in contact with the feed pins of the pin wheel. To permit threading of the tape into the reader unit, the tape hold-down arm 251 is pivoted for rocking movement on the pivot shaft 217 and is retained in either its tape hold-down position or the tape loading position by the action of an overcenter spring 253 extending between a pin 254 on the arm 251 and a stud 255 on the casting 202. The hold-down arm 251 includes a camming surface 256 which is engaged by a stud 257 provided on the upper end of a contact lever 258. The latter is connected at its lower end by an insulating link 259 to a contact RTC. With the hold-down arm 251 in its tape hold-down position, the movable element of the contact RTC biases the arm 258 to the position shown. Upon movement of the hold-down arm 251 counterclockwise to its tape loading position, the camming surface 256 of the hold-down arm moves the lever 258 clockwise by engagement of the stud 257 with the camming surface 256 thereby to open the contact elements of the contact RTC. It will become apparent in a later description of the electrical control circuit that the reader unit remains inoperative so long as the contacts RTC remain open by virtue of the positioning of the tape hold-down arm 251 in its tape loading position.

The reader unit also includes a tape run-out arm 260 for sensing the presence or absence of tape to open the contacts RTC and stop the operation of the reader when the end of the tape is reached. The arm 260 is pivoted on a stud 261 of the base casting 202 and is normally biased to move clockwise by a spring 262. A dependent portion 263 of the arm engages the stud 257 of the contact lever 258 whenever the arm 260 moves under action of its spring 262 in a clockwise direction, thus opening the contacts RTC. The tape hold-down arm 251 includes a stud 264 which, upon movement of the arm 251 to the tape loading position, engages the end portion 263 of the arm 260 and moves the latter counterclockwise to position a hooked end portion 265 of the arm 260 below the plane of the tape passing through the reader. Thus while tape is being loaded into the reader, the hooked end portion 265 of the arm 260 is positioned below the tape, and is moved by the spring 262 upward to engage the undersurface of the tape upon return of the tape hold-down arm 251 to its tape hold-down position shown. The tape passes between the tape guides 266 and 267 which restrain the tape to move through the reader in a generally planar manner at the region of the hooked end 265 of the arm 260. However, as soon as the end of the tape passes out from under the guide 266 the tape no longer is able to prevent the arm 260 from moving clockwise under the action of the spring 262. This movement of the arm 260 and its dependent portion 263 actuates the lever 258 to open the contacts RTC and terminate the operation of the reader unit.

It will be seen from Fig. 1 that the tape enters the reader unit over an arrangement of guide members. The upper one of these guide members is supported on the end of an arm 268 (Figs. 14 and 15) which is pivoted on the end of a base casting stud 269 and has an intermediately positioned flange 270 for operating a switch 271 supported on a bracket 272 from the base casting 202. The range of movement of the arm 268 is limited by a slot 273 provided on an extending portion 274 of the arm 268 and positioned to engage the upper edge of the bracket 272. This arrangement is one for terminating the operation of the reader in the event of excessive tension for any reason of the tape entering the reader unit. To this end, the arm 268 is normally biased counterclockwise as seen in Fig. 14 by the switch plunger or actuator of the switch 271 in which position of the arm 268 the contacts of the switch are closed. Should the tension of the incoming tape become excessive for any reason, it causes the arm 268 to move clockwise and thereby actuate the switch 271 to cause the latter to open its contacts. This will stop the operation of the reader as will become more fully apparent during the description hereinafter of the reader electrical control circuit.

It will be apparent from the foregoing description of the reader unit that the tape controlled contacts 200 are permitted to operate when their associated reading pins 227 enter corresponding perforations in the tape which is fed in steps through the reader unit. Since several sets of contacts are under control of each contact lever 205, the aggregate force of the resilient contact strips 204 on the contact lever is appreciable, but it will be apparent that the interposer structure sustains this force and avoids transmission thereof to the reading pins. Even though the reading pins are the ultimate control instrument for the pin controlled contacts 200, there is only the force of the interposer springs 230 imposed on the reading pins 227 with the result that the reading pins offer no obstruction to the even passage of the tape through the reading zone nor do they tend to make perforations in the tape. The tape may consequently be used repeatedly without fear of damage or undue wear by contact with the reading pins. The reader unit is conveniently rigidly supported on the flared end of the motorized unit casting 34 (Fig. 2) as explained above in connection with the punch unit.

Six bit to five bit code converter-electrical control circuit

The electrical control circuit of a six bit code reader is shown in Fig. 20 and is cable-connected as earlier mentioned to a motorized punch unit having an electrical circuit arrangement as shown in Fig. 21. Figs. 20 and 21 should be considered together as a unitary structure in the manner indicated in Fig. 22.

The punch control circuit of Fig. 21 is used in common with both the 6 bit code reader of Fig. 20 and also with a 5 bit code reader presently to be described and comprising with the punch unit a 5 bit to 6 bit code reconverter arrangement.

The code converter of Figs. 20 and 21 is used to convert a 6 bit or 6 channel tape into an equivalent 5 channel tape which can be used for wire transmission with conventional 5-channel telecommunications systems operating with 5 channel transmitter-distributors. In order to produce a 5 channel tape having the equivalent number of codes to the 6 channel tape, the present converter automatically punches extra codes in the 5 channel tape which designate whether the following codes are in the five level group or in a six level group. In accomplishing this, any code in the 6 channel tape involving the number six code hole will cause a "shift to six level" code to be punched into the 5 channel tape followed by the punching of the five unit portion of the code appearing in the 6 channel tape. In a similar manner, any code in the 6 channel tape which does not involve the number six hole will cause a "shift to five level" code to be punched into the 5 channel tape followed by the punching of the five unit code read from the 6 channel tape. In this the tape reader halts an extra cycle of the punch unit to permit the latter to punch the shift level code followed by the five unit portion of the code read from the tape. These shift level codes are not punched before every significant code in the 5 channel tape, but rather punched only whenever the level changes in the sequence of codes read from the 6 channel tape. Thus, if a series of codes involving the number six code hole are read from the 6 channel tape, a "shift to six level" code will precede only the first code in this group as punched into the 5 channel tape. If this group of codes is then followed by a group which do not involve the number six code hole in the 6 channel tape, a "shift to five level" code will precede only the first code in this group as punched in the 5 channel tape.

In selecting appropriate level shift codes to be used, the code combinations ordinarily must be ones which are not used for any other purposes. Although any particular code can be assigned to the level shift function, in the particular form of code converter herein described the level shift codes selected correspond to the Letters and Figures codes usually used in telecommunications machines. This will be more fully evident from consideration of Fig. 23 which shows a representative selection of codes for Letters, Figures, Punctuation and Functional Control. By selection of the Letters code 1–2–3–4–5 for the "shift to five level" code and the Figures code 1–2–4–5 as "shift to six level" code, the code selection permits a 5 channel tape to be punched by the converter from a 6 channel tape which will have 5 channel code portions corresponding to the usual 5 channel telecommunications code. Note in this regard that the "shift to five level" code 1–2–3–4–5 will precede any one or series of alphabetical characters or the carriage return function. The "shift to six level" code 1–2–4–5 corresponding to the "Figures" shift combination in the usual telecommunications system will precede any numeral or group of numerals, punctuation marks or functional control codes.

The tape reader as will be seen by reference to Fig. 20 includes 6 reading pin controlled contacts RC1—RC6 which remain in the normal position shown in the drawing when there is no hole in the tape for that particular channel but move to the left to their operatives whenever there is a hole in the tape. These code contacts operate at about 60° and remain operated until about 215° in the 360° cycle of reader operation as indicated graphically by curve E in Fig. 24. The tape is advanced one step during each reader cycle by the pin wheel indexing each curve just after the reading pins have been withdrawn from the tape as shown by curve F of Fig. 24.

In addition to the reader code contacts, the motorized reader unit includes three auxiliary cam operated contacts RCC1, RCC2 and RCC3 provided on the operating shaft of the motor unit in the manner shown above in connection with Figs. 2 and 3. These contacts are cam actuated to opened and closed positions at respective points in the cycle of the revolutions of the cam shaft as designated in the drawing, the angular designations noted in the drawing being with respect to the 360° cycle of reader operation. The cam operated contact RCC1 is used to control the energizing circuits of the reader code contacts, and as indicated this contact closes at 65° which is just after all of the reader code contacts have been fully operated and opens at 210° which is just before all of the reader contacts start to be restored to normal position. The other two cam operated contacts RCC2 and RCC3 are associated with the reader clutch magnet RCM energization and are selectively arranged as will later be described to cause the reader to stop in either its zero position or its 180° position in the reader cycle.

A reader tape contact RTC, shown in tape operated position, stops the reader at the zero position of the reader cycle whenever the end of a strip of tape passes a certain point in the reader and is also operated if the tape hold-down arm is not in position to hold the tape in feeding position against the pin wheel. A tight tape contact RTTC, shown in its operating position with normal tape tension, is operated whenever the tape as it feeds into the reader becomes excessively tight.

The reader motorized unit includes a drive motor controlled by a starting relay under control of a manually operable power switch. Also, a reader control switch S2 is provided for controlling the reading function of the reader unit, and an indicating light indicates when the reader is in operation. The motorized reading unit includes a five-level relay 5R, a six-level relay 6R, and a level-change relay CHR.

Turning attention at this point to the general arrangement of the motorized punch unit shown in Fig. 21, it will be seen that it includes six cam actuated contacts PCC1, PCC2, PCC3, PCC4, PCC5 and PCC6 which are provided on the driven shaft of the motorized unit and operate their respective contacts to opened and closed positions at points during each 360° cycle of the punch as indicated on the drawing. A punch includes a punch clutch magnet PCM, which controls each 360° punch cycle and PM1—PM6 which control individual punch pins of the punch unit as described above in connection with Figs. 8–12. It will be understood that, as pointed out in connection with the punch unit, a feed hole is always punched during each punch cycle. A punch tape contact PTC is operated whenever the tape supply is excessively tight or is exhausted and also is operated when the tape hold-down arm is not in position to hold the tape in the feeding position against the pin wheel as described above in connection with the construction of the punch unit. The punch unit also includes a drive motor and starting relay, a power switch S1', and a tape feed switch S3 for feeding out blank tape to enable the operator to feed out sufficient blank tape for easy handling of messages and for securing proper registration of feed holes when two lengths of tape are spliced together. An indicating light indicates when the motorized punch unit is in operation, and a full wave rectifier R supplies direct current for energizing the punch code magnets and punch clutch magnet of the punch unit and the relays and reader clutch magnet of the reader unit.

It may be pointed out that the motorized punch unit is so driven from its drive motor that it operates at approximately 1,000 punch cycles per minute whereas the motorized reader unit is so operated that it will operate at approximately 1,200 reader cycles per minute maximum. The operating speeds of these units are arranged in this way in order that the reader unit will have a sufficient differential above the punch operating speed due to the fact that the reader is in fact controlled by operation of the punch as will be explained in greater detail hereinafter.

It was pointed out in connection with Fig. 1 that the reader and punch units were connected by a multi-conductor flexible electrical cable, and it will be understood that the terminals on the right hand side of Fig. 20 mating with the left hand terminals of Fig. 21 represent plug-receptable connectors for such detachable cable connections.

Consider now the detailed electrical arrangement and operation of the code converter. The negative terminal of the power supply R is connected through a conductor 300, one side of the power switch S1' in its own position, a conductor 301, one pair of normally closed contacts of the tape feed switch S3 in its off position, a conductor 301, and a plug receptacle JL2 to a conductor 302 of the reader unit. The positive potential of the power supply R is supplied through a conductor 303 and a plug receptacle JL16 to a conductor 304 of the reader unit. The negative potential of the conductor 302 is applied through the normally closed contacts of the reader tape contact RTC, a conductor 304, the normally closed contacts of the reader tight tape contact RTTC, a conductor 305, a plug receptacle JL19, the plug tape contact PTC, a plug receptacle JL20 and a conductor 306 to the read switch S2. With the latter manually moved to the "on" position, negative potential is applied through a conductor 307 and the contacts of RCC3 (which are closed when the reader stands at its zero degree point of its operating cycle) and a conductor 308 to the reader clutch magnet RCM having its other terminal connected to the positive potential circuit 304. This energization of the reader clutch magnet causes the reader cam shaft to advance to its 180° position, where the reader clutch mechanically opens to stop the reader and the reader clutch magnet RCM becomes deenergized due to the open-circuit condition of the contacts RCC3 at this point in the reader cycle.

The negative potential circuit 302 of the reader is also connected through the cam operated contacts RCC1, which are closed between 65° and 210° of the reader cycle and apply the negative potential through a conductor 309 to normally closed contacts of the reader contacts RC1, RC2, RC4 and RC5 as shown. If any of the latter code contacts remain in their normal or non-operated position, the negative potential is translated through the contact to a conductor 310 which extends through a plug receptacle JL17 to a circuit 311 connected to the cam operated contacts PCC1, PCC4 and PCC5 of the punch unit, the circuit 310 also extending through a plug receptacle JL4 and a conductor 312 to cam operated contact PCC6 of the punch unit. Whenever the reader reads a normal code other than a delete code 1–2–3–4–5–6, one of the reader contacts RC1, RC2, RC4 or RC5 will remain in non-operated position and thus complete a circuit from the negative potential circuit 302 through the contacts RCC1 to the circuit 310 and through plug receptacles JL17 and JL4 to the several cam actuated contacts PCC1, PCC4, PCC5 and PCC6.

The punch unit is standing at the 0° point in its operating cycle at this time, and accordingly the contact PCC4 is closed and applies the negative potential of the circuit 311 through a conductor 320 and a plug receptacle JL13 to a conductor 321 which is connected as shown to a transfer contact on the reader contact RC6. It will be noted that in the unoperated position of this transfer contact the negative potential of the conductor 321 is applied through a conductor 322 and the contacts 1 and 2 of a relay 5R to energize a level shift relay CHR. In the operated position of the reader contact RC6, the transfer contact mentioned applies the negative potential of the circuit 321 through a conductor 323 and the normally closed contacts 1 and 2 of a six level relay 6R to energize the level change relay CHR. Inasmuch as the first code read by the reader will find both of the relays 5R and 6R deenergized, the transfer contacts of the reader contact RC6 will pick up relay CHR to cause the automatic punching of a shift level code into the 5 channel tape being punched at that time by the punch unit.

Considering this operation in greater detail, the negative potential of the circuit conductor 321 is applied to five of the stationary contacts 10, 13, 16, 18 and 20 of the shift level relay CHR and these contacts in the energized condition of the latter relay are closed to associated movable contacts 9, 12, 15, 17 and 19. Movable contacts 17, 9, 15 and 12 are connected through respective conductors 324, 325, 326 and 327, respective plug receptacles JL7, JL8, JL10 and JL11, and respective conductors 328—331 to the respective punch magnets PM1, PM2, PM4 and PM5 of the punch unit. The movable contact 19 of the level change relay CHR is connected through conductors 332, 333, 334, plug receptacle JL5, conductor 335, and the normally closed contacts of the tape feed switch S3 of the punch clutch magnet PCM. Thus it will be apparent that, insofar as the control circuit last described is concerned, energization of the level change relay CHR energizes the punch clutch magnet PCM and effects punching of a "shift to six level" code 1–2–4–5. The punch magnet PM3 is energized through a conductor 332, a plug receptacle JL9, a conductor 333, the contacts 5 and 6 of the level change relay CHR in energized position, a conductor 334, and normally closed contacts of the reader contact RC6 to the negatively energized conductor 321. Thus if a sixth hole is sensed by the reader to actuate the reader contact RC6, opening its contacts last mentioned, a "shift to six level" code 1–2–4–5 will be punched as last explained, but if a sixth hole is not sensed by the reader a "shift to five level" code 1–2–3–4–5 will be punched.

During the punching of this shift level code, the reader clutch magnet RCM will remain deenergized for this cycle of the punch unit and the reader will accordingly remain at the 180° position of its cycle with the reader code-sensing pins in their operative positions extending through the code holes of the read tape and in effect causing what might be considered temporary storage of the read code. The reason for this temporary halt in the reader cycling is that the negative potential of the conductor 312 of the punch unit is applied by the cam actuated contact PCC6 at 60° of the punch cycle through a conductor 335, a plug receptacle JL1, a conductor 336, the contacts 1 and 2 of the level change relay CHR, the conductor 318, the rectifier CR1, and the cam operated contact RCC2, to the reader clutch magnet RCM. It will be noted that this energizing circuit for the reader clutch magnet RCM is interrupted at the contacts 1 and 2 of the level change relay CHR when the latter is in energized position in effecting the punching of a level shift code, so that the cam operated contact PCC6 is not effective to advance the reader. When the punch cam shaft has rotated 20° of the punch cycle, the cam operated contact PCC1 of the punch unit applies the negative potential of the conductor 311 through a conductor 338, a plug receptacle JL21, and a conductor 339 to the contacts 7 and 8 of the level change relay CHR to hold the latter relay energized to 150° of the punch cycle and thus insure that the relay remains in energized position long enough to effect punching of the shift code by the punch unit.

The cam operated contact PCC5 of the punch unit applies the negative potential of the conductor 311 through a conductor 340, a plug receptacle JL18, and a conductor 341 to a second transfer contact of the reader contact RC6. If the reader contact RC6 remains unoperated, the transfer contact last mentioned energizes the relay 5R through a conductor 342, but if the reader contact RC6 is operated, then the transfer contact energizes the relay 6R through a conductor 343. Thus if a sixth hole is read at this time by the reader, relay 6R becomes energized whereas the absence of a sixth hole causes the relay 5R to become energized. When thus energized, the relay 5R or 6R remains energized through the cam operated contact PCC5 to 150° of the punch cycle. At 100° of the punch cycle, a holding circuit for the energized relay 5R or 6R is established by the cam operated contact PCC3 of the punch through a circuit which may be traced as follows: from the negatively energized conductor 302 of the reader, the reader tape contact RTC, the conductor 304, the plug receptacle JL23, a conductor 344, the cam operated contact PCC3, a conductor 345, a plug receptacle JL15, and a conductor 346 to the hold contacts 4 and 5 of the relay 5R or from the conductor 344 of the punch unit through the cam operated contact PCC2, a conductor 347, a plug receptacle JL14, and a conductor 348 to the hold contacts 4 and 5 of the relay 6R. The cam operated contacts PCC2 and PCC3 thus maintain the selected relay 5R or 6R energized until the punch unit reaches 25° of the next punch cycle. If the next code sensed by the reader is of the same level, the pick-up circuits for either relay 5R or 6R described above would become energized and hold the selected relay operated until the hold circuit for that relay is again established by the cam operated contact PCC2 or PCC3 of the punch unit.

This sequence will continue and no more level shift codes will be punched in the tape until the reader senses a code which is not of the same level as a previous code. Assume by way of example that relay 5R has previously been picked up and held through a number of five level codes punched in the tape, and assume further that the reader next senses a six level code. This causes the cam operated contact PCC4 of the punch unit to pick up the level change relay CHR through an energizing circuit traced from the negatively energized conductor 311 of the punch unit, the cam operated contact PCC4, the conductor 320, the plug receptacle JL13, the conductor 321, the right-hand transfer contacts of the reader contact RC6 (now operated), the conductor 323, the normally closed contacts 1 and 2 of the deenergized relay 6R, to the relay CHR. The relay CHR upon picking up will cause a "shift to six level" code 1-2-4-5 to be punched in the tape, the number 3 hole punch PM3 remaining deenergized, since its energizing circuit is interrupted at this time by the opening of the right-hand contacts of the reader contact RC6 in sensing the sixth level code. Once again a hold circuit for the relay CHR is established through its hold contacts 7 and 8 and the cam operated contact PCC1 of the punch unit. Also at 20° of the punch cycle, the cam operated contact PCC5 will pick up the relay 6R through the left-hand transfer contacts of the reader contact RC6 in its operated position, and it will be held starting at 100° of the punch cycle by the cam operated contact PCC2.

Previously energized relay 5R becomes deenergized during the interval from 25° to 100° of the punch cycle when its holding circuit is opened at the cam operated contact PCC3 and its energizing circuit is interrupted by the left-hand transfer contacts of the reader contact RC6 in operated position. As before, the contacts 1 and 2 of the level change relay CHR interrupt the energizing circuit of the reader clutch magnet RCM during this shift level code punching cycle of the punch unit. Subsequent six level codes read by the reader will cause the punch unit to reproduce the five level code portions thereafter without punching another shift code, and this operation will continue until the next five level code is sensed. It will be apparent that when this occurs, the cam operated contact PCC4 and the right-hand transfer contacts of the reader contact RC6 now energize the level change relay CHR through the conductor 322, and a "shift to five level" code 1-2-3-4-5 will now be punched (the punch magnet PM3 being energized at this time by virtue of the fact that the right-hand contact of the reader contact RC6 is closed since a five level code is sensed).

It has been pointed out that during each punch cycle when the shift level code is punched in the tape, the reader unit remains at the 180° point of its operating cycle since the cam operated contact PCC6 of the punch unit is not able to advance the reader due to the interruption of the reader clutch magnet RCM energizing circuit at the contacts 1 and 2 of the level change relay CHR which is energized during punching of the shift level code. The reader contacts RC1—RC6 accordingly remain in their operated positions for this punch cycle, and upon completion of the punch cycle effect energization through the left-hand contacts of the operated reader contacts of the punch magnets PM1—PM5 through the respective energizing circuits 324—327, the punch clutch magnet PMC being energized by any operated one of the reader contacts RC1—RC5 through the conductor 334, the plug receptacle JL5, the conductor 335, and the normally closed contacts of the punch tape feed switch S3. Note in this regard that the punch does not stop at 360° of its revolution after punching a shift level code since the operated position of any of the reader contacts RC1—RC5 energizes the punch clutch magnet PCM as last described. Assuming that a "shift to six level" code is recorded, the code elements 1–5 of the six level code are accordingly punched into the tape immediately following the shift level code. It will be apparent that an ensuing level code sensed by the reader unit likewise would cause punching of a "shift to five level" code followed immediately by the punching of the five level code read by the reader unit.

When the punch cam shaft has rotated 60° of the second cycle following a shift level punch cycle, the level change relay CHR having previously been deenergized (at 150° of the preceding punch cycle) to close its contacts 1 and 2 permits the cam operated contact PCC6 to energize the reader clutch magnet RCM through an energizing circuit previously traced and thus advance the reader one complete revolution (from 180° to 180° of the reader cycle) to read the next code of the read tape. If the next code sensed is of the same level as the one just punched, the level change relay CHR remains deenergized and the cam operated contact RCC1 of the reader energizes the reader contacts RC1—RC5 through a circuit which includes the contacts 2 and 3 of whichever relay 5R or 6R is energized at that time. Assuming this energized relay to be the relay 6R, this energizing circuit may be traced from the cam operated contact RCC1 through the conductor 309, the right-hand contacts of any non-operated reader contact RC1—RC5 to the conductor 310, the plug receptacle JL17, the conductor 311, the cam operated contact RCC4, the conductor 320, the plug receptacle JL13, the right-hand transfer contact of the reader contact RC6 (now operated since it has been assumed that there is no change of code level from the previous six level which energized the relay 6R), conductor 323, the contacts 2 and 3 of the now energized relay 6R, and the conductors 333 and 334 to each of the left-hand contacts of the reader contacts RC1—RC5. Thus, whichever of the latter contacts stand in operated position effect the energization of the punch magnets PM1—PM5 and the punch clutch magnet PCM to record the read code. This having been done the cam operated contact PCC6 of the punch unit again energizes the reader clutch magnet RCM at 60° of the punch cycle, whereupon the reader once more makes one complete revolution (from 180° to 180°) to read the next following code.

In brief summary of the foregoing described operation, it may be helpful to a more complete understanding of the operation to keep the following timing sequence in mind:

(1) The reader stops at the 180° point of the reader cycle where its reader contacts RC1—RC6 stand in operated positions.

(2) The punch clutch magnet PCM is thereupon energized and the punch starts a cycle of operation.

(3) Assuming a shift level code to occur, the level change relay CHR is picked up by the cam operated contact PCC4 at 0° of the punch cycle and a selected one of the relays 5R or 6R is picked up by the cam operated contact PCC5 at 20° of the punch cycle and is held by this contact to 150° of the punch cycle.

(4) At 100° of the punch cycle either the cam operated contact PCC2 or PCC3 will hold the selected relay 5R or 6R through the completion of the punch cycle and to 25° of the next punch cycle.

(5) The reader unit remains at the 180° point of its cycle throughout the first punch cycle and the cam operated contact PCC6 at 60° of the second punch cycle initiates a new cycle (180° to 180°) of the reader unit; the reader must advance to 360° and continue on past 65° before the cam operated contact RCC1 will permit energization of the punch clutch magnet PCM to release the punch for a new cycle of punch operation (in this, it has been pointed out above that the reader contacts RC1—RC6 closed their contacts at 60° of each new reader cycle).

A "delete" code 1-2-3-4-5-6 read from the tape automatically cycles the reader unit but causes the punch unit to remain quiescent during this reader cycle, thus effectively skipping each delete code without causing it to be punched into the tape of the punch unit. This operation will now be considered in detail, and it will be apparent that the same operation prevails in the event that the reader should be reading a tape in which a "shift to six level" code 1-2-4-5 or a "shift to five level" code 1-2-3-4-5 is recorded. A delete code causes operation of all of the reader contacts and particularly the contacts RC1, RC2, RC4 and RC5, and this actuation of these reader contacts prevents the negative potential impressed through the cam operated contact RCC1 on conductor 309 from being applied through conductor 310 and plug receptacle JL17 to the cam operated contact PCC4 of the punch unit. Accordingly, the latter is unable to impress a negative potential through conductor 320, plug receptacle JL13, and conductor 321 on the right hand transfer contacts of the reader contact RC6 so that neither the level change relay CHR can be energized nor can these transfer contacts of RC6 impress a negative potential through the conductor 322 or 323 and the contacts 2 and 3 of relay 5R or 6R (whichever be energized at this time) on the conductor 333 so that neither the punch clutch magnet PCM nor any of the punch magnets PM1—PM5 can be energized. The punch unit thus remains quiescent when a delete code (or "shift to six level" or "shift to five level") code is read. At the same time, however, the negative potential impressed through the cam operated contact RCC1 on the conductor 309 is impressed on the reader clutch magnet RCM through a circuit which may be traced as follows: through the center positioned contacts of reader contact RC5 to the conductor 315, the contacts of RC4 to the conductor 316, the contacts of RC2 to the conductor 317, and the contacts of RC1 to the conductor 318, rectifier CR1, conductor 349, cam operated contacts RCC2, and conductor 308 to the reader clutch magnet RCM. This causes the reader to cycle from 180° to 180° of the reader cycle. Thus the reader is caused to skip the "delete" code of the read tape (and likewise "shift to six level" and "shift to five level" codes) without any actuation of the punch unit. It will be apparent that the operation described is repetitive should a series of repetitive delete codes be recorded in the read tape.

When the end of the read tape passes over the reader tape contact RTC and causes the latter to transfer its contacts, a circuit is established to cause the reader thereupon to return to and remain at the 0 point of its operating cycle. This circuit may be traced from the negatively energized conductor 302 of the reader unit, through the now transferred contacts RTC to a conductor 349, a cam operated contact RCC2 (the contacts of which are closed when the reader is at the 180° point of its operating cycle), and the conductor 308 to the reader clutch magnet RCM. The transfer of the RTC contact will also interrupt the hold circuits for the relays 5R and 6R (which circuit includes the conductor 304, the plug receptacle JL23, and the conductor 344 to the cam operated hole circuit contacts PCC2 and PCC3) to insure that a level shift code will be the first code punched when a new tape is made.

The reader and punch units will automatically be stopped if either the reader tight tape contact RTTC or the punch tape contact PTC is operated by any condition which causes the tape to become excessively tight, each of these contacts being included in series with the reader switch S2 and the cam operated contact RCC3 which normally causes the reader to cycle past the 0° point of its reading cycle. However, no extra shift codes will be punched in the tape as a result of this operation, since the hold circuit for the relays 5R or 6R does not extend through either the reader tight tape contact RTTC or the punch tape contact PTC, so that whichever relay 5R or 6R is energized will remain energized. Manually operating the read switch S2 to the "off" position, while not automatic, has the same result as operation of the reader tight tape contact RTTC or punch tape contact PTC. Therefore, the reader operation may be interrupted at any time by manual actuation of the read switch S2 or by automatic operation of the contacts RTTC or PTC without effecting undesirable punching of an extra shift code upon resumed operation of the reader. However, the tape hold-down arm must not be raised at the reader unit since this would operate the reader tape contact RTC and effect interruption of the hold circuit of the relays 5R or 6R and result in an extra shift code being punched upon continued operation of the reader unit.

A diode rectifier CR2 is provided between the conductor 309 and the conductor 304 to prevent a spurious level shift code being punched should the reader tape contact RTC transfer in the middle of a punch cycle at the end of the read tape. That is, if the rectifier CR2 were not used and the reader tape contact RTC should transfer, as by the end of the tape actuating this contact, one of the relays 5R or 6R being in energized position would thereupon release to cause the level change relay CHR to become energized through the contacts 1 and 2 of the released relay. Should this occur from 260° to 0° of the punch cycle, it would cause the level change relay CHR to recycle the punch unit and punch a false shift code. The rectifier CR2 prevents this mode of operation by impressing the negative potential of the conductor 309 (existing on this conductor throughout the normal punch cycle) on the conductor 304 which extends through the plug receptacle JL23 and the conductor 344 to the hold circuit cam operated contacts PCC2 and PCC3 for the relays 5R and 6R. It was pointed out above that the transfer of the contact RTC causes the reader to advance from the 180° point to the 0° point of the reader operating cycle, and the action of the rectifier CR2 in maintaining the hold circuit for the relays 5R or 6R as last described continues the hold circuit to 210° of the reader cycle at which point the reader contacts RC1—RC6 have been moved to unoperated positions. Thus the level change relay CHR can no longer be energized through the right-hand transfer contacts of the reader contact RC6 and the cam operated contact PCC4, which must receive its negative potential through any of the reader contacts RC1, RC2, RC4 or RC5 from the cam operated contact RCC1 which opens its contacts at 210° of the reader cycle. The rectifier CR2 accordingly serves to maintain one of the relays 5R or 6R energized while there is any danger of the cam operated contact PCC4 energizing the level change relay CHR.

As pointed out above, the cam operated contact RCC2 pulses the reader clutch magnet RCM to bring the reader back to the 0° point of the reader cycle. When the RTC contact transfers at the end of the read tape. It is the particular purpose of the rectifier CR1 to prevent impressing the negative energizing potential now on conductor 349 upon the conductor 318 and other conductors of the reader which might be connected to the conductor 318 through various closed contacts.

Manual operation of the tape feed switch S3 to the "on" position interrupts the negative potential supplied from the motorized punch unit to the motorized reader unit through the plug receptacle JL2, thus rendering the reader inoperative during a tape feed operation of the punch unit. The other contacts of the tape feed switch S3 transfer the energizing circuit of the punch clutch magnet from the reader, normally through plug receptacle JL5, directly to the negative terminal of the power supply R. Since all punch code magnets PM1—PM6 are deenergized due to the aforementioned interruption of the negative potential supplied to the reader unit, only feed holes are punched in the tape during each of the repetitive cycles of punch operation which occur during the interval of energization of the punch clutch magnet PCM by manual actuation of the tape feed switch S3. When sufficient leader or trailer tape has been thus fed out of the punch unit, the tape feed switch S3 is manually operated to its "off" position to allow normal operation of the punch and reader units.

It may be noted that the energizing circuit for the motor of the reader motorized unit extends through the power switch S1 and plug receptacles JL3 and JL6 to the power supply line of the motorized punch unit.

In both the reader and punch units back-to-back rectifiers are shown connected across the relay magnets, clutch magnets and punch magnets. It is the purpose of these rectifiers to minimize possible radio interference by minimizing arcing which tends to occur at the moment of opening of energizing circuit contacts due to the high voltage developed across an inductor by interruption of current through the inductor. The rectifiers shunt this high voltage around the winding of the magnet or relay and thus minimize its presence in the energizing circuit of the latter.

*Five bit to six bit code converter-electrical control circuit*

The converter hereinbefore described normally reads a 6 bit form of code and converts it to 5 bit form suitable for wire transmission to a remote point. The transmitted information is recorded in 5 bit code corresponding to that transmitted, and this 5 bit code is then converted (or "reconverted") and re-recorded in the original 6 bit form of code. This re-recording may then be used for automatically reproducing copy by a writing machine of the same or similar type as that which produced the original recording in 6 bit code forms.

In thus converting recorded information from 5 bit code form to 6 bit form, the motorized tape punch of Fig. 21 is used with a 5 bit code reader having an electrical control circuit as shown in Fig. 24. Thus, Figs. 21 and 24 should be considered together as a unitary structure in the manner shown in Fig. 25.

Much of the Fig. 24 reader electrical control circuit is the same, and involves the same components, as the Fig. 20 reader. Accordingly, elements of Fig. 24 corresponding to the like elements of Fig. 20 are identified by the same reference numerals and characters and analogous elements by the same reference numerals primed. Thus the motorized code reader of Fig. 24 includes reader contact RC1—RC5, but includes in addition to the three cam operated contacts RCC1—RCC3 three further cam operated contacts RCC4—RCC6. Of these, the cam operated contacts RCC1—RCC3 perform the same functions in controlling the reader clutch magnet RCM and in energizing the reader contacts RC1—RC5 as was explained in connection with the Fig. 20 reader. The cam operated contacts RCC4 and RCC6 are associated with pick and hold circuits of the relay 6R' which differs in its contact arrangement from the relay 6R of Fig. 20. A level change relay SCR is provided in the present reader and operates under control of the cam operated contact RCC5. When the punch unit of Fig. 21 is used with the present reader, the cam operated contacts PCC1—PCC3 and PCC5 perform no control function.

Considering now in greater detail the arrangement and operation of the present converter arrangement, it is necessary that the first code read in any tape supplied to the reader unit to one of the "level shift" codes 1–2–4–5 or 1–2–3–4–5. Assuming for purposes of the present description that the first read code is a "shift to five level" code 1–2–3–4–5, all of the contacts RC1–RC5 are operated. As in the case of the Fig. 20 reader, when tape is placed in the reader in reading position to operate the reader tape contact RTC and the read switch S2 is closed, the cam operated contact RCC3 advances the reader from the 0° position to the 180° position of the reader cycle. At 65° of the reader cycle, the cam operated contact RCC1 closes and applies the negative potential of the conductor 302 through the conductor 309 to the right-hand contacts of the reader contacts RC1, RC2, RC4, and RC5. Since all of these contacts are in operated position under the assumed condition that the first read code is a "shift to five level" code 1–2–3–4–5, none of the contacts are able to translate the negative potential of the conductor 309 to a conductor 352 common to these contacts and connected through the cam operated contact RCC4, the conductor 321, and the plug receptacle JL13 to the cam operated contact PCC4 of the punch unit. It will be recalled that the latter contact is that which controls the energization of the punch clutch magnet PCM by which to initiate each cycle of punch operation. Accordingly, the punch unit remains quiescent at this time. The negative potential impressed by the cam operated contact RCC1 on conductor 309 is, however, translated by the center contacts of the reader contacts RC1, RC2, RC4 and RC5 and through conductors 317, 316 and 315 to a conductor 353. The potential on the latter conductor accordingly energizes the level change relay SCR through the now closed cam operated contact RCC5 and a conductor 354. The contacts 2 and 3 of the latter relay now energize the reader clutch RCM through a circuit which may be traced from the negatively energized conductor 302, the contacts 2 and 3 of the level change relay SCR, a conductor 355, the cam operated contact RCC2, and the conductor 308 to the reader control magnet RCM. This energization of the reader control magnet RCM will advance the reader one complete revolution from 180° to 180° of its operating cycle. The effect of this is that the reader automatically is caused to skip the first level shift code read by it (and likewise to skip each succeeding shift level code which it reads), and the punch unit is quiescent during this reader cycle so that the shift level code is not recorded in the tape being punched at that time by the punch unit. The level change relay SCR becomes deenergized at 210° of that reader cycle during which the shift level code is read by reason of the opening of the cam operated contact RCC5.

It was assumed that the first shift level code read was a "shift to five level" code, so that on the second revolution of the reader drive shaft a five level code will be sensed by the reader contacts RC1—RC5 before the reader stops at 180° of its operating cycle. Certain of the reader contacts RC1—RC5 will accordingly be operated, but at least one of the reader contacts RC1, RC2, RC4 or RC5 will complete an energizing circuit from cam operated contact RCC1 through conductor 309 to the conductor 352. The negative potential on the latter conductor is now impressed through the cam operated contact RCC4 on the conductor 321, and is applied through plug receptacle JL13 to the cam operated contact PCC4 of the punch unit which is closed since the punch is at rest. This potential is accordingly translated through conductor 311, plug receptacle JL17 and conductor 210 to the left-hand contact of all of the reader contacts RC1—RC5 so that whichever contacts stand in operated position effect energization of corresponding ones of the punch magnets PM1—PM5 through respective conductors 324, 325, 333, 326 and 327. At the same time the punch clutch magnet PCM is energized to initiate a cycle of punch operation, its energization being traced from the conductor 310 of the reader unit through plug receptacle JL5, conductor 335, and normally closed contacts of the tape feed switch S3. As explained above in connection with the Fig. 20 reader unit, the cam operated contact PCC6 of the punch unit closes its contacts at 60° of the punch cycle and energizes the reader clutch magnet RCM through a circuit which may be traced from the negatively energized conductor 302 of the reader unit, cam operated contact RCC1, conductor 309, plug receptacle JL4, conductor 312, cam operated contact PCC6, conductor 335, plug receptacle JL1, conductor 336, normally closed contacts 1 and 2 of the level change relay SCR, conductor 355, cam operated contact RCC2, and conductor 308 to the reader clutch magnet RCM. The reader accordingly advances a full 360° to its 180° position. This interrelated operation of the reader and punch units will be repeated until the end of the tape being read or until a "shift" to six level" code 1-2-4-5 is read from the tape.

When the reader senses a "shift to six level" code 1-2-4-5, it establishes a circuit which will energize the sixth punch magnet PM6 of the punch unit during all following codes punched in the tape until a "shift to five level" code 1-2-3-4-5 is read or the end of the tape stops the reader. Reading a "shift to six level" code 1-2-4-5 again opens up all parallel circuits established by the reader contacts RC1, RC2, RC4 and RC5 between the conductor 309 and the conductor 352 from which latter conductor the punch clutch magnet PCM is energized to initiate each punch cycle. The series circuit earlier described between the reader contacts RC1, RC2, RC4 and RC5 will again be established by reading the "shift to six level" code, thus again energizing the level change relay SCR in the manner previously explained and causing the reader again to cycle by energization of the reader clutch magnet RCM. There is the difference in this case, however, that the potential of the conductor 353 (which caused energization of the level change relay SCR through the cam operated contact RCC5) is applied through the normally closed contacts of the unoperated reader contact RC3 and a conductor 356 to energize pick-up winding W1 of the relay 6R'. At 203° of the reader cycle, the cam operated contact RCC6 establishes a holding circuit for the relay 6R' through a conductor 357, the now closed contacts 12 and 13 of the relay 6R', and a conductor 358. This holding circuit is maintained until the reader reaches 73° of its next revolution. With relay 6R' thus energized, the punch magnet PM6 is energized with the punch clutch magnet PCM through a circuit which may be traced from the punch magnet PM6 through a conductor 359, a plug receptacle JL12, a conductor 360, and the now closed contacts 14 and 15 of the relay 6R' to the conductor 310 from which the punch clutch magnet PCM is energized. Thus a sixth hole is punched on each cycle of the punch unit so long as the relay 6R' remains energized. In order to keep the relay 6R' energized on succeeding cycles until the read tape runs out or a "shift to five level" code is read, a second winding W2 of the relay 6R' is energized from any of the unoperated contacts RC1, RC2, RC4 or RC5 over the portion 65° to 210° of each reader cycle through the cam operated contact RCC4 and the now closed contacts 2 and 3 of the relay 6R'. This energization of the relay winding W2 thorugh cam operated contact RCC4 alternates with the energization of the relay winding W1 through the cam operated contact RCC6 to hold the relay 6R energized as long as desired. The relay 6R' will become deenergized the next time a "shift to five level" code is read because there will then be no circuit through any of the normally closed RC1—RC5 reader contacts by which to maintain the relay 6R' energized when the hold circuit established by the cam operated contact RCC6 is opened at 73° of the reader cycle. As before, when any such shift level code is read by the reader the punch unit remains quiescent during the reader cycle as earlier explained.

From the foregoing description of the invention, it will be apparent that code form conversion from a higher level code to a lower level code or from lower to higher level codes involve code forms in which certain code levels are common to both forms but the codes are distinctive as between the forms insofar as certain of the recorded information is concerned. In other words, in the six level code form, five code levels record predetermined information whereas the sixth level is distinctive of additional recorded information. In similar manner, the five levels of a five level code are used for the recording of predetermined information whereas the distinctive characteristic of this code with respect to additional recorded information lies in code level groupings each preceded by a distinctive code indicative both of the beginning and of the code level of the following group of recorded information. It will accordingly be apparent that certain information is recorded only in the common five levels of both code forms and this is accomplished without exceeding the five levels available, whereas the distinctive sixth level of the six-level code is converted to the distinctive code groupings of the five-level code insofar as the additional recorded information is concerned and conversely the additional information corresponding to the distinctive code groupings of the five-level code is recorded by use of the distinctive sixth level of the six-level code.

It will further be apparent that a code-form converter embodying the present invention effects automatic conversion of received coded information from one code form to a second code form having either a smaller or a larger number of code bits than employed by the first code form. In doing so, it will be apparent that there is no loss of recorded information, yet conversion is accomplished in a relatively simple and inexpensive apparatus requiring minimized supervision by unskilled personnel and one having a high degree of accuracy and reliability in operation with high rate of information handling capacity.

While specific forms of the invention have been described for purposes of illustration, it is contemplated that numerous changes may be made without departing from the spirit of the invention.

What is claimed is:

1. A recorded-code translating system comprising: means having a cyclic operation for reading a code-recorded medium to derive successive information items recorded therein by use of a first plural-bit code form utilizing a preselected code level, a cycle of said operation extending from an information item code-reading state of said means to a succeeding information item code-reading state thereof; means having a cyclic operation initiated by the code-reading state of said reading means for receiving in parallel-bit presentation each code read thereby and for translating said each code by parallel-bit translation and in a second plural-bit code form utilizing a code level differing from said preselected level; means responsive to the initiation of a cycle of operation of said translating means for initiating a further cycle of operation of said reading means; and means responsive to code-level indicative information recorded in said medium and derived by said reading means for effecting automatic recycling of one of said reading and translating means to preserve the full information content of the information in said first code form as derived by said reading means and that in said second code form as translated by said translating means.

2. A recorded-code translating system comprising: means having a cyclic operation for reading a code-recorded medium to derive successive information items recorded therein by use of a plural-bit code form utilizing a six-level code, a cycle of said operation extending from an information item code-reading state of said means to a succeeding information item code reading state thereof; means having a cyclic operation initiated by the code-reading state of said reading means for receiving in parallel-bit presentation each code read thereby and for translating said each code by parallel-bit translation and in a second plural-bit code form utilizing a five-level code; means responsive to the initiation of a cycle of operation of said translating means for initiating a further cycle of operation of said reading means; and means responsive to code level indicative information recorded in said medium and derived by said reading means for effecting automatic recycling of said translating means to preserve the full information content of the information in said six-level code form as derived by said reading means and that in said five-level code form as translated by said translating means.

3. A recorded-code translating system comprising: means having a cyclic operation for reading a code-recorded medium to derive successive information items recorded therein by use of a plural-bit code form utilizing a five-level code, a cycle of operation extending from an information item code-reading state of said means to a succeeding information item code-reading state thereof; means having a cyclic operation initiated by the code-reading state of said reading means for receiving in parallel-bit presentation each code read thereby and for translating said each code by parallel-bit translation and in a second plural-bit code form utilizing a six-level code; means responsive to the initiation of a cycle of operation of said translating means for initiating a further cycle of operation of said reading means; and means responsive to code level indicative information recorded in said medium and derived by said reading means for effecting automatic recycling of said reading means to preserve the full information content of the information in said five-level code form as derived by said reading means and that in said six-level code form as translated by said translating means.

4. A recorded-code translating system comprising recorded-code reading means revolving in cycles with respect to a quiescent zero position but controllable to stop at an intermediate code-reading position of each cycle for reading and temporarily storing information recorded in a record medium by use of a first plural-bit code form utilizing a preselected code level, means having a cyclic operation initiated by the code-reading state of said reading means for receiving in parallel-bit presentation each code read thereby and for translating said each code by parallel-bit translation and in a second plural-bit code form utilizing a code level different from said preselected level, means responsive to the initiation of a cycle of operation of said translating means for controlling said reading means to release said reading means past said intermediate code-reading position thereof, and means responsive to code level indicative information recorded in said medium and derived by said reading means for effecting automatic recycling of one of said reading and translating means to preserve the full information content of the information in said first code form as derived by said reading means and that in said second code form as translated by said translating means.

5. A recorded-code translating system comprising recorded-code reading means revolving in cycles with respect to a quiescent home position but controllable to stop at preselectable partial revolutions of each cycle for reading and storing information recorded in a record medium, means normally operative to effect automatic stopping of said reading means at said preselected partial-revolution position thereof, means having a cyclic operation initiated by the code-reading state of said reading means for receiving in parallel-bit presentation each code read thereby and for translating said each code by parallel-bit translation and in a second plural-bit code form utilizing a code level differing from said preselected level, means responsive to the initiation of a cycle of operation of said translating means for controlling said stopping means to release said reading means past said preselected partial-revolution stop thereof and thereby initiate a further reading cycle of operation of said reading means, and means responsive to code level indicative information recorded in said medium and derived by said reading means for effecting automatic recycling of one of said reading and translating means to preserve the full information content of the information in side first code form as derived by said reading means and that in said second code form as translated by said translating means.

6. A recorded-code translating system comprising recorded-code reading means revolving in cycles with respect to a quiescent zero home position but controllable to stop at the 180° position of each cycle for reading and temporarily storing information recorded in a record medium by use of a first plural-bit code form utilizing a preselected code level, means normally operative to effect automatic stopping of said reading means at said 180° position thereof but responsive to manual actuation for stopping said reading means at said zero position thereof; means having a cyclic operation initiated by the 180° cyclic position of said reading means for receiving in parallel-bit presentation each code read thereby and for translating said each code by parallel-bit translation and in a second plural-bit code form utilizing a code level differing from said preselected level, means responsive to the initiation of a cycle of operation of said translating means for controlling said stopping means to release said reading means past said 180° positional stop thereof, and means responsive to code level indicative information recorded in said medium and derived by said reading means for effecting automatic recycling of one of said reading and translating means to preserve the full information content of the information in said first code form as derived by said reading means and that in said second code form as translated by said translating means.

7. A recorded-code translating system comprising recorded-code reading means revolving in cycles with respect to a quiescent home position but controllable to stop at preselectable partial revolutions of each cycle for reading and storing information recorded in a record medium, means normally operative to effect automatic stopping of said reading means at said preselceted partial-revolution position thereof but responsive to manual actuation for stopping said reading means at said home position thereof, means having a cyclic-operation initiated by the code-reading state of said reading means for receiving in parallel-bit presentation each code read thereby and for translating said each code by parallel-bit translation and in a second plural-bit code form utilizing a code level differing from said preselected level, means responsive to the initiation of a cycle of operation of said translating means for controlling said automatic stopping means to release said reading means past said preselected partial-revolution stop thereof and thereby initiate a further reading cycle of operation of said reading means, and means responsive to code level indicative information recorded in said medium and derived by said reading means for effecting automatic recycling of one of said reading and translating means to preserve the full information content of the information in said first code form as derived by said reading means and that in said second code form as translated by said translating means.

References Cited in the file of this patent

UNITED STATES PATENTS

| | | |
|---|---|---|
| 1,966,386 | Haglund | July 10, 1934 |
| 2,057,653 | Potts | Oct. 13, 1936 |
| 2,152,772 | Potts | Apr. 4, 1939 |
| 2,458,144 | Bush | Jan. 4, 1949 |
| 2,504,002 | Crum | Apr. 11, 1950 |
| 2,526,628 | Belock | Oct. 24, 1950 |
| 2,619,532 | Blodgett | Nov. 25, 1952 |
| 2,716,156 | Harris | Aug. 23, 1955 |
| 2,717,921 | De Saules | Sept. 13, 1955 |
| 2,724,739 | Harris | Nov. 22, 1955 |

UNITED STATES PATENT OFFICE
CERTIFICATE OF CORRECTION

Patent No. 2,927,158

March 1, 1960

Edwin O. Blodgett

It is hereby certified that error appears in the printed specification of the above numbered patent requiring correction and that the said Letters Patent should read as corrected below.

Column 18, line 5, for "purposes" read -- purpose --; column 22, line 64, after "ensuing" insert -- five --; column 25, lines 39 and 40, for "cycle. When" read -- cycle, when --; column 26, line 33, for "contact" read -- contacts --; column 27, line 44, for "210" read -- 310 --; column 28, line 40, for "thorugh" read -- through --; column 30, line 60, for "side" read -- said --.

Signed and sealed this 27th day of September 1960.

(SEAL)
Attest:

KARL H. AXLINE
Attesting Officer

ROBERT C. WATSON
Commissioner of Patents